United States Patent
Carlstrom, Jr.

[11] Patent Number: 6,071,635
[45] Date of Patent: Jun. 6, 2000

[54] EASILY-FORMABLE FUEL CELL ASSEMBLY FLUID FLOW PLATE HAVING CONDUCTIVITY AND INCREASED NON-CONDUCTIVE MATERIAL

[75] Inventor: Charles M. Carlstrom, Jr., Clifton Park, N.Y.

[73] Assignee: Plug Power, L.L.C., Latham, N.Y.

[21] Appl. No.: 09/054,670

[22] Filed: Apr. 3, 1998

[51] Int. Cl.$^7$ ................................................ H01M 8/04
[52] U.S. Cl. .............................. 429/34; 429/32; 429/39; 427/115
[58] Field of Search ................................. 429/32, 34, 38, 429/39; 427/115

[56] References Cited

U.S. PATENT DOCUMENTS

| | | | |
|---|---|---|---|
| 3,528,859 | 9/1970 | Miller et al. | 136/86 |
| 3,589,942 | 6/1971 | Leitz, Jr. et al. | 136/86 |
| 3,880,670 | 4/1975 | Shinn | 429/38 |
| 4,091,176 | 5/1978 | Alfenaar | 429/40 |
| 4,159,367 | 6/1979 | Berchielli et al. | 429/38 |
| 4,197,178 | 4/1980 | Pellegri et al. | 205/255 |
| 4,214,969 | 7/1980 | Lawrance | 438/38 X |
| 4,345,986 | 8/1982 | Korach | 204/266 |
| 4,410,410 | 10/1983 | Deborski | 204/277 |
| 4,476,002 | 10/1984 | Howard et al. | 204/283 |
| 4,602,426 | 7/1986 | Kampe et al. | 29/623.1 |
| 4,636,291 | 1/1987 | Divisek et al. | 204/283 |
| 4,769,296 | 9/1988 | Sterzel | 429/12 |
| 5,064,734 | 11/1991 | Nazmy | 429/115 X |
| 5,077,148 | 12/1991 | Schora et al. | 429/13 |
| 5,108,849 | 4/1992 | Watkins et al. | 429/30 |
| 5,190,833 | 3/1993 | Goldstein et al. | 429/27 |
| 5,424,144 | 6/1995 | Woods | 429/39 X |
| 5,472,801 | 12/1995 | Mattejat et al. | 429/39 |
| 5,482,792 | 1/1996 | Faita et al. | 429/30 |
| 5,547,777 | 8/1996 | Richards | 429/32 |
| 5,558,948 | 9/1996 | Doyon | 429/40 |
| 5,565,072 | 10/1996 | Faita et al. | 204/256 |
| 5,595,840 | 1/1997 | Henning et al. | 429/210 |
| 5,616,431 | 4/1997 | Kusunoki et al. | 429/36 |
| 5,652,073 | 7/1997 | Lenhart et al. | 429/210 |
| 5,683,828 | 11/1997 | Spear et al. | 429/13 |
| 5,709,961 | 1/1998 | Cisar et al. | 429/32 |
| 5,789,093 | 8/1998 | Mahli | 429/39 X |

*Primary Examiner*—Stephen Kalafut
*Attorney, Agent, or Firm*—Heslin & Rothenberg, P.C.

[57] ABSTRACT

A fluid flow plate is preferably formed with conductive member(s) and non-conductive material(s). The conductive member(s) and/or the non-conductive material(s) form portion(s) of land(s) and/or flow channel(s) on face(s) of the plate. The flow channel(s) pass between and/or among the land(s). The flow channel(s) can be optimized to service fluid(s) for a fuel cell assembly. The conductive member(s) form electrical path(s) between, among, about and/or around position(s) on the face(s) of the plate. The electrical path(s) serve to conduct electrical current generated by the fuel cell assembly. The non-conductive material(s) can form brace(s) for, and/or seal(s) with, portion(s) of the flow channel(s). The non-conductive material(s) can form portion(s) of a periphery of the face(s) of the plate, and/or portion(s) of any appropriate geometric feature(s) for the plate. The non-conductive material(s) can be injection-molded. The non-conductive material(s) can form means for aligning the fluid flow plate with an adjacent plate. The non-conductive material(s) can form means for maintaining clamping pressure on a component between the fluid flow plate and an adjacent plate.

85 Claims, 19 Drawing Sheets

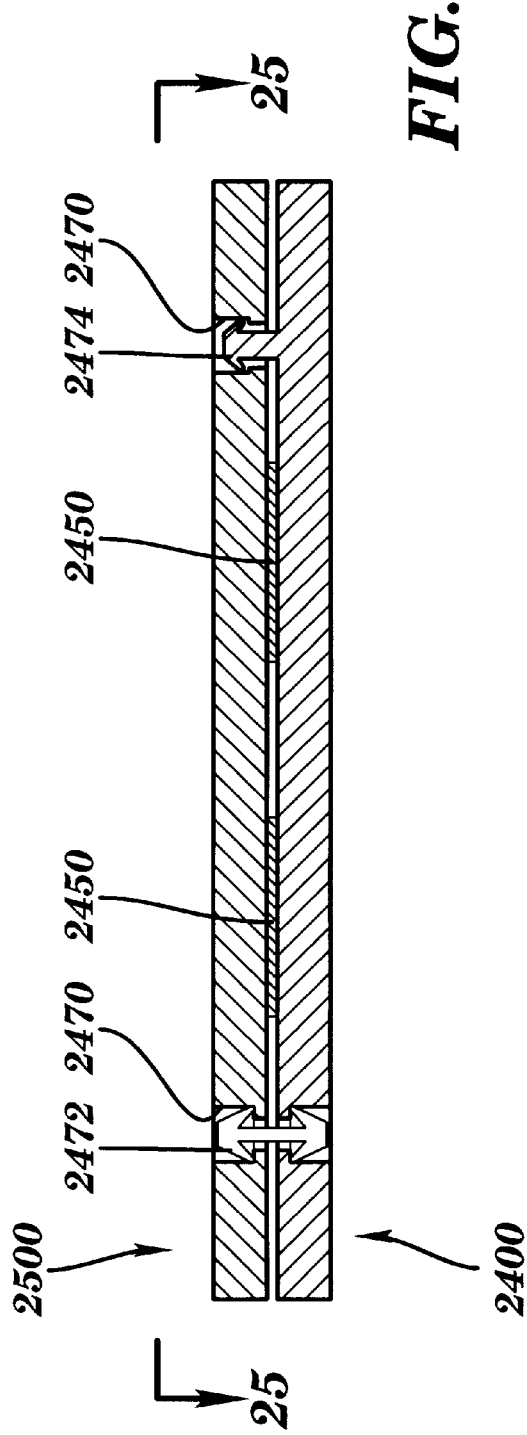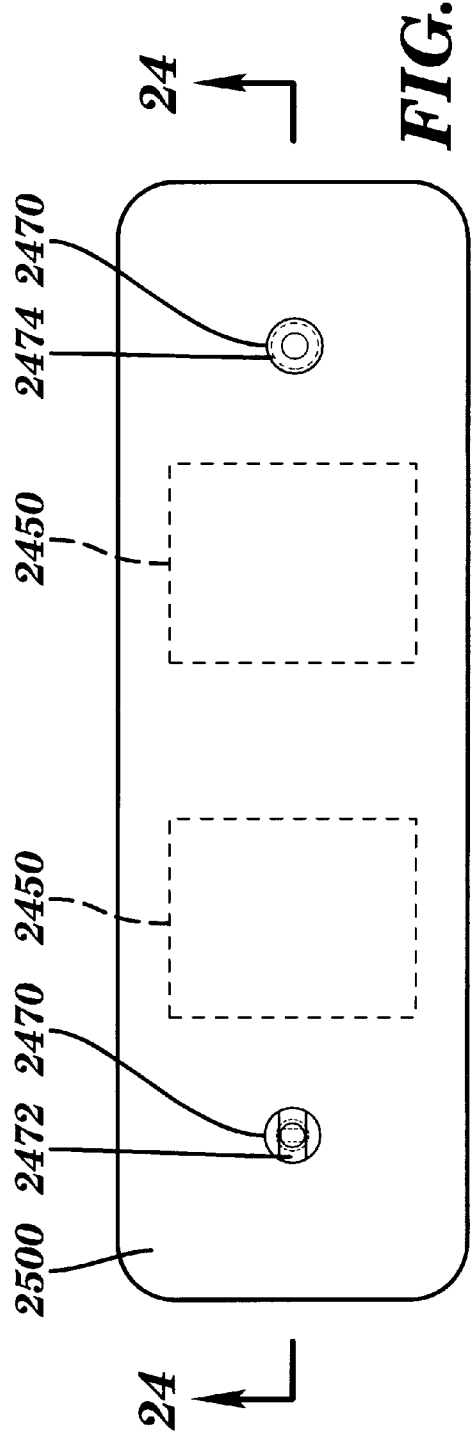

EASILY-FORMABLE FUEL CELL ASSEMBLY FLUID FLOW PLATE HAVING CONDUCTIVITY AND INCREASED NON-CONDUCTIVE MATERIAL

CROSS REFERENCE TO RELATED APPLICATION

This application relates to co-filed, commonly assigned U.S. patent application Ser. No. 09/054,425, entitled "PEM-TYPE FUEL CELL ASSEMBLY HAVING MULTIPLE PARALLEL FUEL CELL SUB-STACKS EMPLOYING SHARED FLUID FLOW PLATE ASSEMBLIES AND SHARED MEMBRANE ELECTRODE ASSEMBLIES," Attorney Docket No. 1404.018, the entirety of which is hereby incorporated herein by reference.

TECHNICAL FIELD

This invention relates, generally, to fuel cell assemblies and, more particularly, to configuration of fluid flow plates for fuel cell assemblies.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates for each fuel cell. Also, other fluid manifolds circulate coolant (e.g., water) for cooling.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

Flow field plates are commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Usually, each flow field plate is subjected to a sealing process (e.g., resin impregnation) in order to decrease gas permeation therethrough and reduce the risk of uncontrolled reactions. Typically, flow field channels are engraved or milled into a face of the rigid, resin-impregnated graphite plate. Undesirably, permeability of the graphite and machining processes therefor limit reduction of plate thickness. So, one is disadvantageously limited from increasing the number of corresponding fuel cells which occupy a particular volume in a fuel cell stack, and which can contribute to overall power (voltage, current) generation. Moreover, resin-impregnated graphite plates are susceptible to brittle failure and expensive in terms of cost of raw materials, as well as time for processing and tool wear in machining.

Another known flow field configuration places a mattress of metal-wire fibers between a bipolar plate and an electrocatalytic electrode, which is in turn adjacent to an ion exchange membrane. The mattress of metal-wire fibers acts as distributor for the reactants and products, in addition to providing deformability and resiliency in the electrochemical cell. The bipolar plate can omit flow channels and is formed from aluminum or other metal alloys. Such a design is disclosed in U.S. Pat. No. 5,482,792 to Faita et al. (entitled "Electrochemical Cell Provided With Ion Exchange Membranes and Bipolar Metal Plates," issued Jan. 9, 1996, and assigned to De Nora Parmelec S.p.A.) and U.S. Pat. No. 5,565,072 to Faita et al. (entitled "Electrochemical Cell Provided With Ion Exchange Membranes and Bipolar Metal Plates," issued Oct. 15, 1996, and assigned to De Nora Parmelec S.p.A.). A shortcoming of this design is the material resource expense and weight in constructing the bipolar plate entirely from metal. A further shortcoming is the material resource expense and weight, as well as the space consumption, in providing the mattress of metal-wire fibers. In addition, the formation of the geometric features for the metal plate is expensive in terms of time and tool wear in machining.

Thus, a need exists for a flow field plate, and a fuel cell assembly of which it is a part, allowing formation thereof with decreased use of conductive material, which material is expensive and heavy. A further need exists for such a flow field plate, and fuel cell assembly, in which flow channel(s) and other geometric feature(s) can be shaped to optimize fluid(s) service, such as reactant fluid flow to the membrane and cooling therefor. Also, a need exists for such flow channel(s) and other geometric feature(s) to be easily formable.

SUMMARY OF THE INVENTION

Pursuant to the present invention, shortcomings of the existing art are overcome and additional advantages are provided through the provision of a fluid flow plate having a conductive member and non-conductive material. In a first aspect of the invention, the conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms a brace for a portion of the flow channel.

In one aspect of the invention, the brace can include a portion of the non-conductive material mechanically engaged with first and second locations on the conductive member. The brace can include a portion of the non-conductive material lodged crosswise within the flow channel. The brace can include a portion of the non-conductive material enveloping a portion of the first land. The non-conductive material can form a seal with the portion of the flow channel.

The portion of the flow channel can comprise a first portion of the flow channel, and the conductive member can form the first portion of the flow channel. Also, the non-conductive material can form a second portion of the flow channel. The non-conductive material can form a turn and/or a port for the flow channel.

The non-conductive material can form a portion of a periphery of the first face of the plate. The non-conductive material can form a portion of the first face of the plate, which portion can be adapted to serve as gasketing material for the fuel cell assembly. The non-conductive material can form a portion of the first face of the plate, which portion can be adapted to receive gasketing material for the fuel cell assembly.

The non-conductive material can form a first portion of the first face of the plate, which first portion can be ultrasonically weldable and/or frictionally weldable to a second portion of a layer of the fuel cell assembly. The non-conductive material can form on the first face an orifice for a fluid manifold and/or an opening for a structural member for the fuel cell assembly.

The at least one fluid can include reactant fluid, product fluid, and/or humidification fluid for a fuel cell of the fuel cell assembly. Further, the fuel cell can comprise a PEM-type fuel cell.

The flow channel can comprise a first flow channel and the at least one fluid can comprise at least one first fluid. Also, the non-conductive material can form a portion of a second flow channel on the first face of the plate, and the second flow channel can be adapted to service at least one second fluid for the fuel cell assembly. Further, the at least one second fluid can include reactant fluid, product fluid, humidification fluid and/or coolant.

The first face of the plate can include a plurality of flow channels which can be substantially parallel and/or generally serpentine. The flow channel can comprise a first flow channel, and the first face of the plate can include a second flow channel passing between the lands. Also, the non-conductive material can form a portion of the second flow channel.

The first face can include a third land located between the first and second lands, and the non-conductive material can form a portion of the third land. The first land can be adapted for electrical coupling with a porous conductive layer of the fuel cell assembly. On the first face of the plate, the non-conductive material can form first and second flow channel sections and a third land therebetween, and the first flow channel section can be adapted to service at least one fluid for the fuel cell assembly.

The non-conductive material can be injection-molded. The fluid flow plate can be divided into multiple fluid flow sub-plates, each fluid flow sub-plate being electrically insulated from other fluid flow sub-plates of the multiple fluid flow sub-plates.

The conductive member can comprise a first conductive member, the electrical path can comprise a first electrical path, and the position can comprise a first position. Further, a second conductive member can form a second electrical path between a second position on the first face and a third position on the second face, where the second electrical path can be adapted to conduct electrical current generated by the fuel cell assembly.

In another aspect of the invention, a fluid flow plate includes non-conductive material and a conductive member. A first face of the plate includes the non-conductive material. The non-conductive material forms first and second flow channel sections and a land therebetween. The first flow channel section is adapted to service at least one fluid for a fuel cell assembly. The conductive member forms an electrical path between a first position on the first face and a second position on a second face of the plate. The electrical path is adapted to conduct electrical current generated by the fuel cell assembly.

In yet another aspect of the present invention, the conductive member can form the electrical path about and/or around the first flow channel section. The first flow channel section can be formed without the conductive member.

The first flow channel section can be adapted to optimize service of the at least one fluid for a membrane of the fuel cell assembly. The first and second flow channel sections can comprise a flow channel for the fuel cell assembly. The first flow channel section can comprise a first flow channel for the fuel cell assembly, and the at least one fluid can comprise at least one first fluid. Also, the second flow channel section can comprise a second flow channel which can be adapted to service at least one second fluid for the fuel cell assembly. Further, the at least one second fluid can include reactant fluid, product fluid, humidification fluid and/or coolant.

The land can comprise a first land, and the first face of the plate can include a second land which can be located between the first and second flow channel sections. Also, the conductive member can form a portion of the second land.

The conductive member can be adapted for electrical coupling with a porous conductive layer of the fuel cell assembly. The conductive member can comprise a first conductive member, and the electrical path can comprise a first electrical path. Also, the plate can include a second conductive member which can form a second electrical path between a third position on the first face of the plate, and a fourth position on the second face of the plate. In addition, the second electrical path can be adapted to conduct electrical current generated by the fuel cell assembly.

The non-conductive material can form a brace for a portion of the first flow channel section. The non-conductive material can form a seal with a portion of the first flow channel section. The land can resemble a tent pole.

The invention further contemplates a process for forming a simple aspect and a complicated aspect of a geometric feature on a face of a fluid flow plate. The plate is formed with conductive material and non-conductive material. The simple aspect of the geometric feature is formed with a first portion of the conductive material. A periphery of the face of the plate is formed with a second portion of the non-conductive material, and without the conductive material. Also, the periphery includes the complicated aspect of the geometric feature.

In a further aspect of the invention, the geometric feature can comprise a flow channel, and the complicated aspect can include a turn and/or a port. An orifice for a fluid manifold and/or an opening for a structural member for the fuel cell assembly, can be formed with the periphery. The second portion of the non-conductive material can be formed with injection molding.

In forming the periphery, a seal can be formed with the first portion of the conductive material. In forming the periphery, a brace can be formed for the first portion of the conductive material.

In another aspect of the invention, a fluid flow plate includes a conductive member and non-conductive material. The conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms on the first face of the plate an orifice for a fluid manifold for the fuel cell assembly. Also, the non-conductive material is injection-molded.

In yet another aspect of the present invention, a fluid flow plate includes a conductive member and non-conductive material. The conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms a portion of the first face of the plate which is adapted to serve as gasketing material for the fuel cell assembly. Also, the non-conductive material is injection-molded.

In another aspect of the invention, the portion of the first face of the plate can accomplish a gasketing function.

In a further aspect of the invention, a fluid flow plate includes a conductive member and non-conductive material. The conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms a portion of the first face of the plate which is adapted to receive gasketing material for the fuel cell assembly. Also, the non-conductive material is injection-molded.

In another aspect of the invention, the portion of the first face of the plate can include a slot. The portion of the first face of the plate can include a means to hold said gasketing material.

In a still further aspect of the present invention, a fluid flow plate includes a conductive member and non-conductive material. The conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms a means for aligning the fluid flow plate with an adjacent plate of the fuel cell assembly.

In another aspect of the invention, the means for aligning the fluid flow plate with the adjacent plate can include a detent, a knob, and/or a hole.

In yet another aspect of the present invention, a fluid flow plate includes a conductive member and non-conductive material. The conductive member forms first and second lands on a first face of the plate. The first face of the plate includes a flow channel passing between the lands. The flow channel is adapted to service at least one fluid for a fuel cell assembly. The conductive member forms an electrical path between the first land and a position on a second face of the plate. The electrical path is adapted to conduct electrical current generated by the fuel cell assembly. The non-conductive material forms a means for maintaining clamping pressure on a component between the fluid flow plate and an adjacent plate of the fuel cell assembly.

In a further aspect of the invention, the means for maintaining clamping pressure can include a latch. The component can include a membrane electrode assembly and/or a gas diffusion layer.

Thus, the present invention advantageously provides a simple construction for a fluid flow plate that is conductive, easily-formable, light-weight and considerably resistant to compression.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 24 is a cutaway, sectional, partial, side representation of twelfth and thirteenth exemplary embodiments of the fluid flow plate of FIG. 2, illustrating one example of an attaching feature for the fluid flow plates, in accordance with the principles of the present invention; and FIG. 25 is a plan view directed substantially along line 25—25 of FIG. 24.

BEST MODE FOR CARRYING OUT THE INVENTION

In accordance with the principles of the present invention, a fuel cell assembly is provided in which a fluid flow plate has advantageous cooperation among conductive member(s) and non-conductive material(s) to optimize fluid(s) service and feature formation, with desirably decreased material resource expense and weight, as well as increased ease and enhancement(s) for manufacturing.

Figure 1:
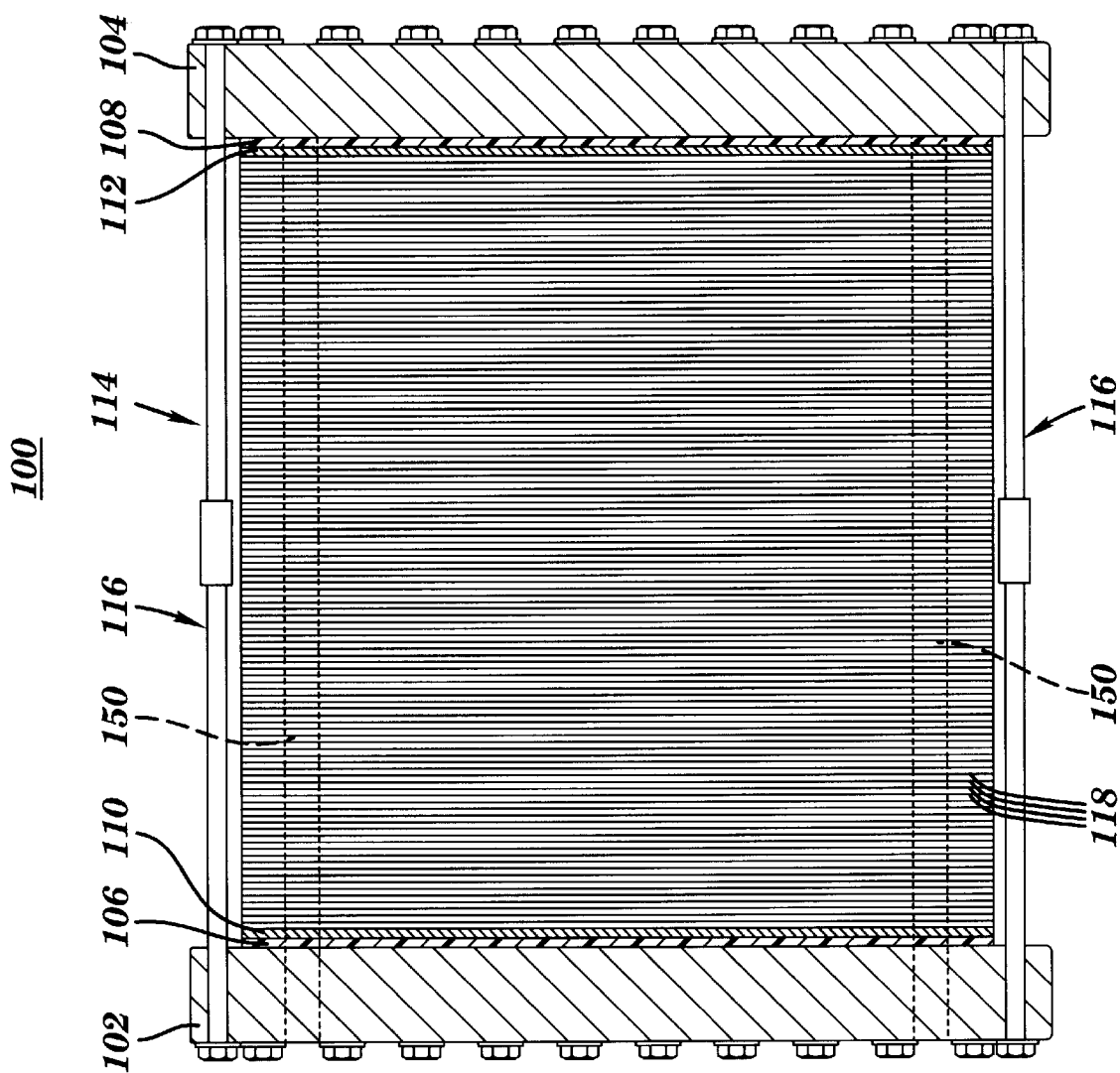
FIG. 1 is a sectional, elevation, side view of one example of a fuel cell assembly incorporating and using the fluid flow plate(s) of the present invention.

An example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. The working section includes one or more active sections and can include a selected number of cooling sections, as will be understood by those skilled in the art. In one aspect, the one or more active sections can further serve to perform cooling for the fuel cell assembly. A number of structural members 116 can be employed to join the end plates.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art. The layers of fuel cell assembly 100 might have applied thereto compressive forces which are approximately equivalent to, preferably, fifty to one thousand pounds per square inch, and, most preferably, two hundred to four hundred pounds per square inch.

Figure 3:
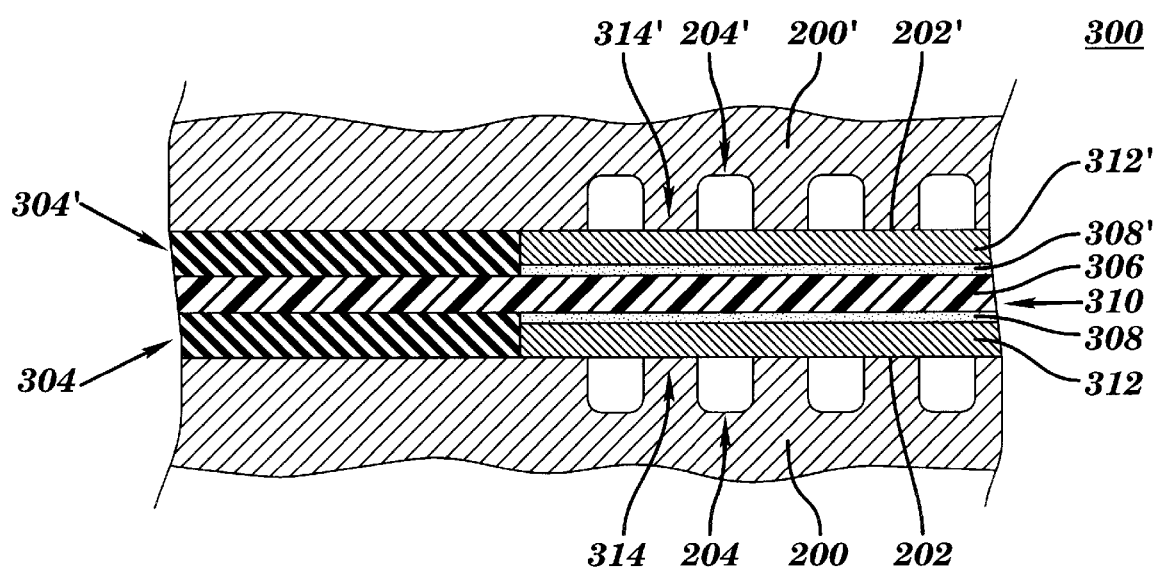
FIG. 3 is a cutaway, sectional, partial, side representation of fluid flow plates serving as flow field plates in a fuel cell of the fuel cell assembly of FIG. 1, in accordance with the principles of the present invention.

Preferably, a plurality of layers 118 form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
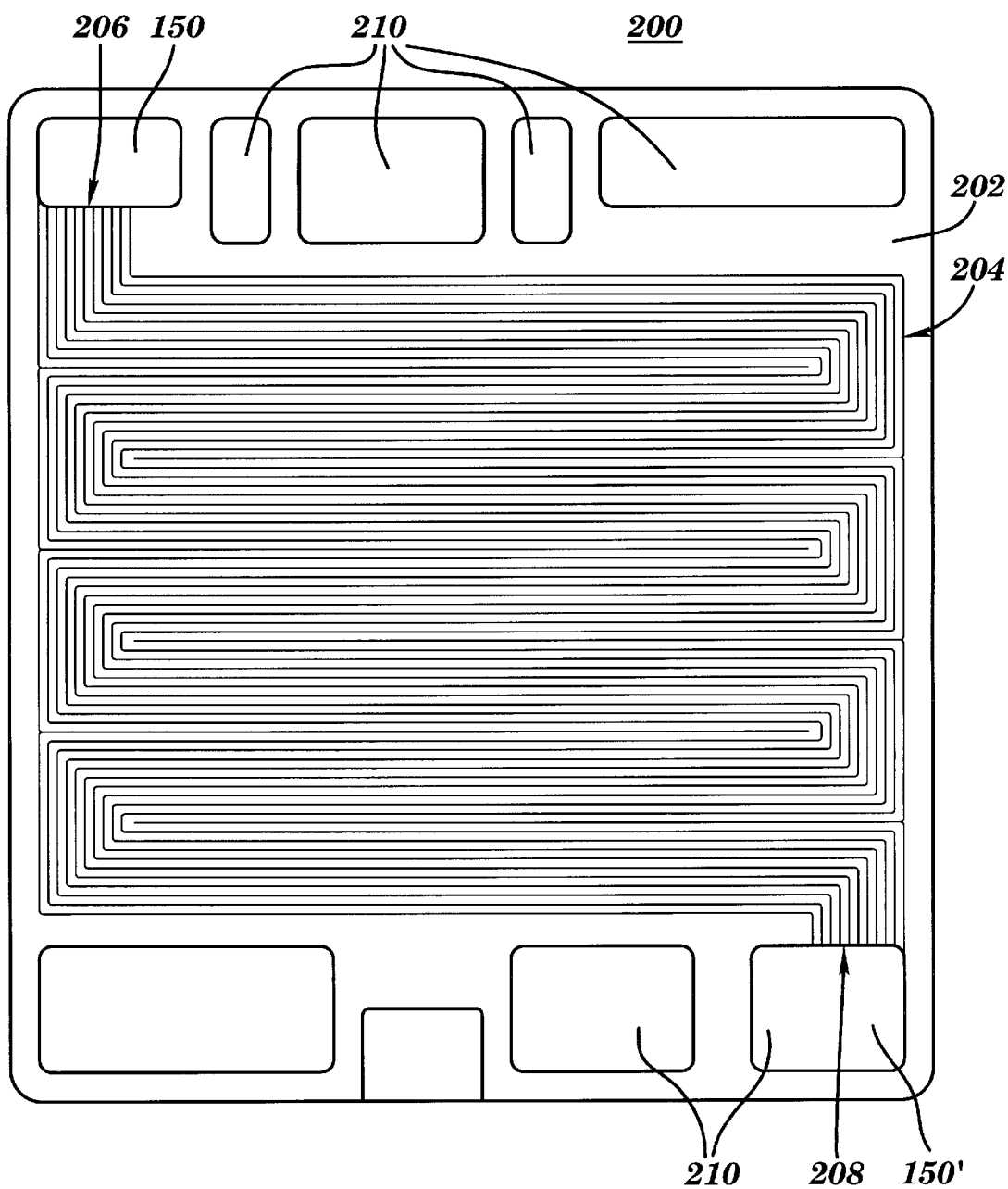
FIG. 2 is a plan view of an outer face of one example of a fluid flow plate of the fuel cell assembly of FIG. 1.

One example of a layer 118 of working section 114 is depicted in FIG. 2 as fluid flow plate 200. The plate has a fluid flow face 202 with one or more substantially parallel and generally serpentine flow channel(s) 204 thereon. The flow channels receive and transmit one or more fluids through ports 206 and 208 which are in fluid communication with corresponding fluid manifolds 150 and 150'. For instance, the flow channels can include respective inlet(s) 206 and outlet(s) 208 in fluid communication with corresponding entry and exit fluid manifolds 150 and 150'.

As will be understood by those skilled in the art, a given fluid flow plate 200 may be a bipolar, monopolar, combined monopolar (e.g., anode cooler or cathode cooler), or cooling plate. In one example, the fluid flow plate serves as a flow field plate and flow channels 204 conduct fluid which includes reactant fluid for fuel cell assembly 100. The reactant fluid serves as fuel or oxidant for a given fuel cell 300 (FIG. 3). For instance, the flow channels can carry reactant gas (e.g., a fuel such as hydrogen or an oxidant such as air/oxygen) as well as liquid (e.g., humidification and/or product water), as will be understood by those skilled in the art.

A typical fluid flow plate 200 might have a height which is preferably in the range 1.0 to 20.0 in., and is most preferably in the range 8.0 to 10.0 in. Additionally, the width of the fluid flow plate is preferably in the range 1.0 to 20.0 in., and is most preferably in the range 7.0 to 9.0 in. Further, the thickness of the fluid flow plate is preferably in the range 0.02 to 0.30 in., and is most preferably in the range 0.05 to 0.15 in. Also, the cross-sectional dimension of width of a given flow channel 204 on face 202 is preferably in the range 0.01 to 0.10 in., and is most preferably in the range 0.02 to 0.05 in., with the cross-sectional dimension of depth of the flow channel preferably in the range 0.002 to 0.050 in., and most preferably in the range 0.010 to 0.040 in. In addition, the cross-sectional dimension of width of a land separating adjacent flow channel sections, for example, land 314, 314' (FIG. 3), is preferably in the range 0.01 to 0.10 in., and is most preferably in the range 0.02 to 0.05 in.

Referring to FIG. 2, fluid flow plate 200 has a number of peripheral holes 210 therethrough, which can cooperate in formation of fluid manifolds of fuel cell assembly 100. Preferably, the perimeters of layers 118 are formed with minimal amounts of material disposed generally transversely beyond the active extent of working section 114 as well as the fluid manifolds of fuel cell assembly 100, as represented in FIG. 2.

In one embodiment, gasketing material or gaskets 304, 304' (FIG. 3) can be employed to seal peripheral holes 210 (FIG. 2) and cooperate with the longitudinal extents of layers 118 in formation of the fluid manifolds. Referring to FIG. 3, a given gasket 304, 304' might take the form of, for instance, a frame gasket made from a polytetrafluoroethylene ("PTFE") material manufactured by E. I. DuPont de Nemours Company and sold under the trademark TEFLON®. In another embodiment, multiple O-ring gaskets might be employed. Additional gasketing schemes in accordance with the present invention are described further below.

For purposes of illustration, FIG. 3 depicts fuel cell 300 with fluid flow plates 200, 200' serving as flow field plates. In particular, flow field plate 200 might serve as an anode side of the fuel cell, and flow field plate 200' might serve as a cathode side of the fuel cell. That is, face 202 might be an anode face, and face 202' might be a cathode face. For instance, flow channels 204 might carry hydrogen, as fuel, and humidification water. Further, flow channels 204' might carry air/oxygen, as oxidant, as well as humidification water and/or product water, as will be understood by those skilled in the art.

Fuel cell 300 includes membrane or solid electrolyte 306. Preferably, solid electrolyte 306 is a solid polymer electrolyte made using a polymer such as a material manufactured by E. I. DuPont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which can be formed with a resilient and conductive material such as carbon fabric or carbon fiber paper. In one embodiment of a gas diffusion layer 312, 312', porous carbon cloth or paper is infused with a slurry of carbon black and sintered with TEFLON® material. The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of the MEA a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally into the cathode flow channels, to prevent flooding of the catalyst particles.

In one example, water having a pH value of approximately five might be added to a given reactant gas stream conducted by flow channel(s) 204, 204'. The water would desirably serve to humidify membrane 306.

For purposes of illustration, a number of preferred implementations of fluid flow plate 200 incorporating and using the novel features of the present invention are described below with reference to the Figures.

As will be appreciated by those skilled in the art, feature(s), characteristic(s), and/or advantage(s) of conductive member(s) 414 and/or non-conductive material(s) 416 described herein in any exemplary embodiment may appropriately be applied and/or extended to any embodiment in accordance with the principles of the present invention.

Figure 4:
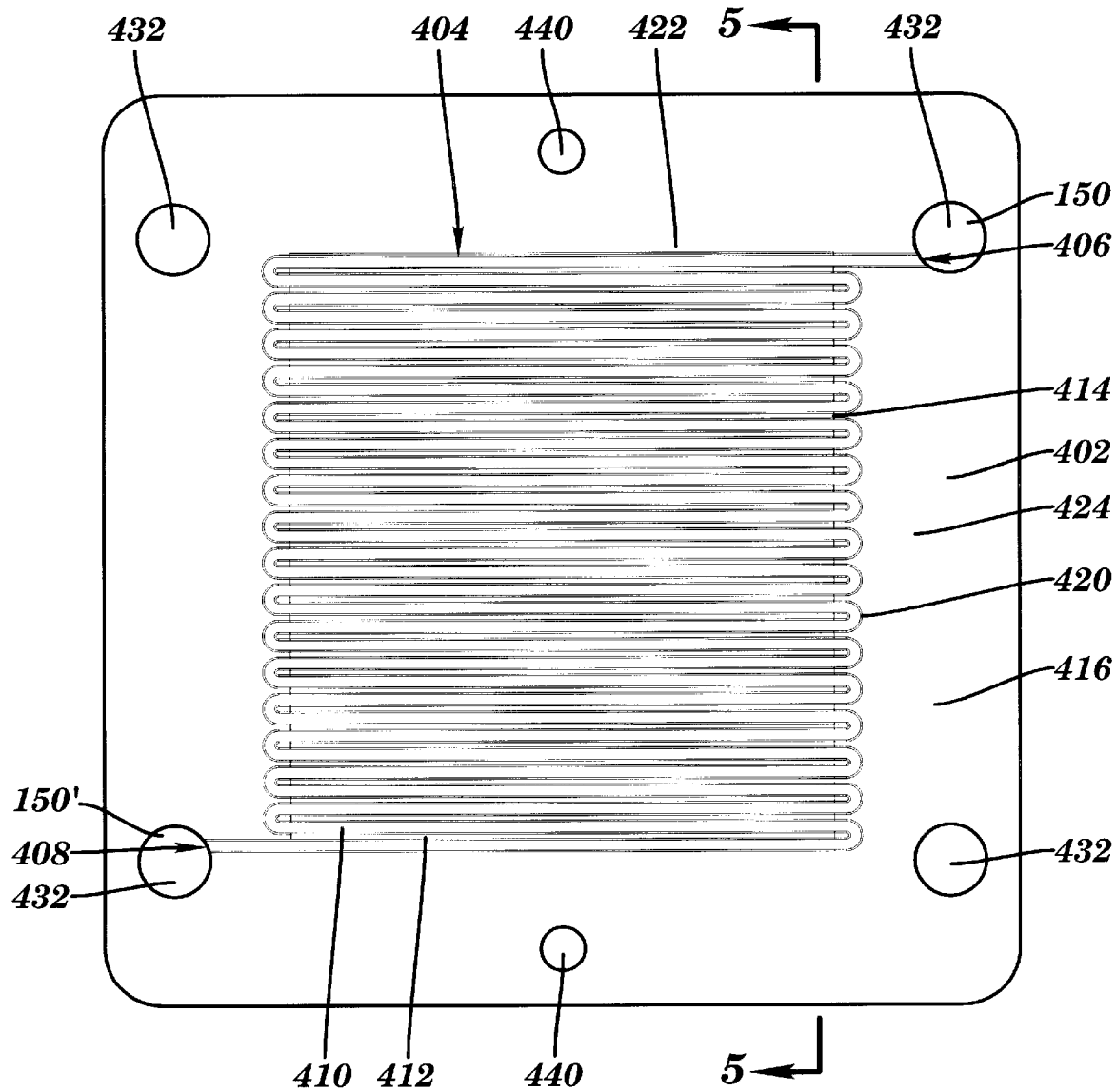
FIG. 4 is a plan view of a first exemplary embodiment of the fluid flow plate of FIG. 2, illustrating the fluid flow plate having a conductive member and non-conductive material, in accordance with the principles of the present invention.
Figure 5:
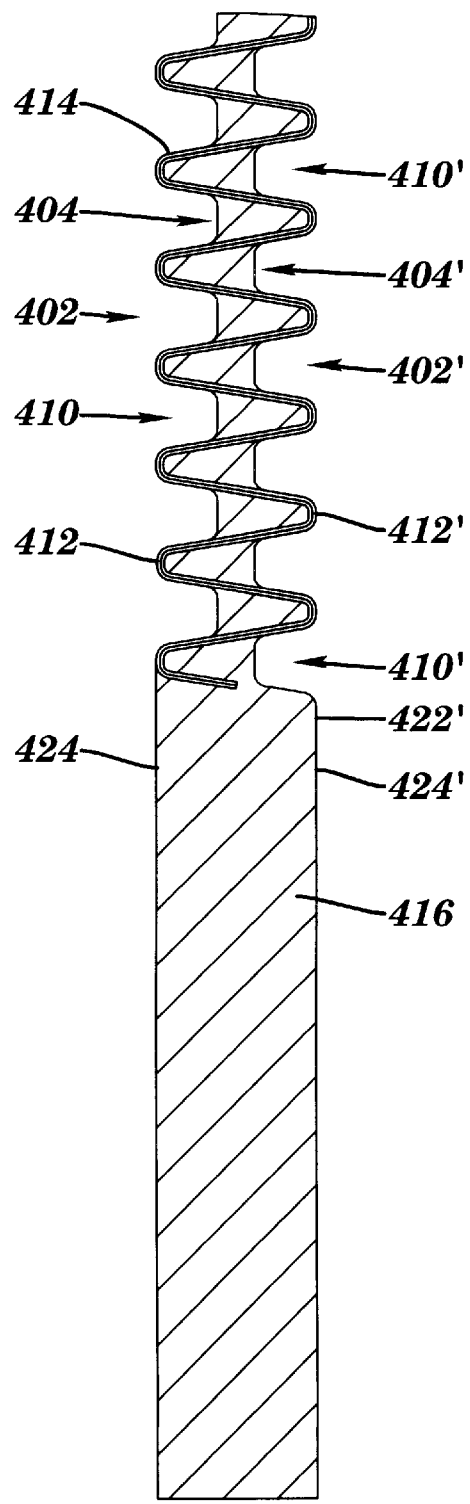
FIG. 5 is a magnified, cutaway, sectional, partial view directed substantially along line 5—5 of FIG. 4.

As a first exemplary embodiment, FIGS. 4–5 depict fluid flow plate 400 having first face 402 with flow channel 404 thereon, and second face 402' with flow channel 404' thereon.

Referring to FIG. 4, flow channel 404 may be formed generally serpentine on fluid flow face 402 with port/inlet 406 and port/outlet 408 in fluid communication with corresponding fluid manifolds 150 and 150'. The flow channel can include a number of substantially straight intermediate channel sections 410 which pass between lands 412. In a preferred embodiment, a conductive member 414 (FIG. 5) forms all but a "last" land 422 (FIG. 4), 422' (FIG. 5) in a respective series of lands 412, 412' on corresponding fluid flow face 402, 402'.

In accordance with the principles of the present invention, conductive member 414 serves to provide an electrical path between faces 402 and 402' of fluid flow plate 400. In one example, land(s) 412 on face 402 provide contact(s) which are electrically coupled with land(s) 412' on face 402', for conduction of electrical current generated by fuel cell assembly 100.

The above-mentioned "last" land 422, 422' in a given series of lands 412, 412' is preferably formed integrally with a portion of periphery 424, 424' of fluid flow face 402, 402', as depicted in FIGS. 4–5. The terminology "last" land is provided for explanatory purposes, since a "last" land in a given series of lands can easily instead be considered a "first" land in the series.

In a preferred embodiment, conductive member 414 is formed as a corrugated member, as depicted in FIG. 5. In one aspect, the above-described formation of "last" land 422, 422' integrally with a portion of periphery 424, 424' of fluid flow plate 400 represents a preferred design choice serving to provide diametrically opposed ports 406 and 408 for fluid service for flow channel 404, while minimizing the amount of material resource required to form the conductive member, in accordance with the principles of the present invention.

For instance, conductive member 414 may be formed with a material such as non-magnetic, austenitic stainless steel. In one example, the conductive member might be formed by stamping patterns into thin stainless steel sheet stock. That is, one may stamp grooves, valleys, or indentations on first face 402 which protrude through the sheet to form ridges, crests, protuberances, or lands 412' on second face 402'. In another example, the conductive member might be formed with a product manufactured by Robinson Fin Machines, Incorporated (Kenton, Ohio) and sold under a trade designation such as plain fin, flat crest stainless steel.

An exemplary construction of fluid flow plate 400 employing conductive member 414 is now described. First, the conductive member is passivated, as will be understood by those skilled in the art. Next, the conductive member is placed into a mold to yield desirable geometric feature(s) for fluid flow plate 400. For instance, non-conductive material (s) 416 may be injected into the mold to form a brace for flow channel 404, along with turns 420 and ports 406 and 408 of flow channel 404, in accordance with the principles of the present invention.

In one example, non-conductive material(s) 416 might be formed with plastic, polymer, rubber and/or other material (s). For instance, the non-conductive material(s) might be formed with a product manufactured by Phillips Chemical Company (Bartlesville, Okla.) and sold under the trademark RYTON™, for example, the product RYTON™ Poly Phenylene Sulfide.

Advantageously, non-conductive material(s) 416 enable less expensive formation of complicated geometric feature(s) for a fluid flow plate, as described herein. For purposes of illustration, one may consider formation of fluid flow plate(s) contrary to the present invention. For example, previous designs employed conductive material, such as stainless steel or graphite, in formation of complicated geometric feature(s). Such previous designs suffer shortcomings because the conductive material itself presents limits in formability, and because formation of feature(s) into the conductive material is difficult and expensive in terms of machining time and tool wear.

In contrast, the present invention enables complicated features to be formed easily with non-conductive material 416, for example, through injection molding. In one aspect, the high formability of certain non-conductive material(s) enables easy formation of desirable geometric feature(s). In another aspect, all geometric feature(s) can easily and conveniently be formed at inception of the fluid flow plate(s), and/or the fluid flow plate(s) can be easily reconfigured, without requiring further machining of the non-conductive material(s), once formed, to produce geometric feature(s) ancillary and/or supplementary to simple geometric feature(s) provided by conductive member 414, as described herein.

Furthermore, the formation of the brace for a flow channel through employment of non-conductive material 416 preferably serves to support and/or stabilize a portion of the flow channel, as described herein. Advantageously, the performance of the non-conductive material as a brace for the flow channel enables the flow channel to be formed with a decreased amount of conductive material, for savings in terms of material resource expense, as detailed herein with reference to the Figures.

In one aspect, non-conductive material 416 can form a portion of an intermediate channel section 410, 410', as depicted in FIGS. 4–5. Also, for flow channel 404, the non-conductive material can form a desired geometry between a given intermediate channel section 410 and a given port 406, 408 and/or a given fluid manifold 150, 150'.

In an alternative embodiment of fluid flow plate 400, or other fluid flow plate(s) described herein, one could easily form a plurality of substantially parallel flow channels 404, for instance, through appropriate configuration of non-conductive material 416, such as for a low-pressure-drop system, for advantageous energy savings, as will be appreciated by those skilled in the art. For example, the flow channel(s) of any embodiment in accordance with the principles of the present invention could easily be formed simply straight, with non-conductive material 416 preferably providing shared fluid manifolds 150 and 150' in fluid communication with the flow channel(s), as will be understood by those skilled in the art.

In another aspect, non-conductive material(s) 416 can perform a sealing function for a portion of flow channel 404. Also, the non-conductive material(s) can form a turn 420 and/or any number of additional geometric feature(s) for fluid flow plate 400. Moreover, the non-conductive material (s) preferably further form a portion of periphery 424 for fluid flow plate 400.

So, non-conductive material 416 enables conductive member 414 to have an efficient and/or effective formation. That is, non-conductive material 416 can be employed to provide complicated geometries and/or electrical isolation for enhancing properties and/or characteristics for fluid flow plate 400, and/or operation of fuel cell 300 (FIG. 3) and/or fuel cell assembly 100 (FIG. 1), as described herein. In one aspect, one may preserve material resource(s) by treating or considering turn(s) 420 formed with the non-conductive material, as outside an active area of the flow field. For instance, one could choose to not superimpose the turn(s) with a gas diffusion layer, thereby saving material resource expense in forming the gas diffusion layer.

Non-conductive material(s) 416 decrease cost and difficulty in forming feature(s) for fuel cell 300 and/or fuel cell assembly 100, in accordance with the principles of the present invention. In particular, use of the non-conductive material(s) in accordance with the present invention makes possible many desirable fastening and/or manifolding schemes with beneficial result(s) such as lowered cost, increased simplicity, and/or increased robustness.

For instance, referring to FIG. 4, non-conductive material 416 could easily form orifices 432 for formation of fluid manifolds 150 and 150', ameliorating and/or obviating any need for such feature(s) to be formed through a separate machining step. As another example, the non-conductive material desirably enables formation of opening(s) 440 for receiving therethrough structural members 116 (FIG. 1) such as tie-bolt(s), where the non-conductive material further serves to electrically isolate the structural members from conductive member 414. Therefore, the structural members can be positioned more interiorly in fuel cell assembly 100, for advantageous reduction of bending moment(s) for layer(s) 118 of the fuel cell assembly, as will be appreciated by those skilled in the art. That is, by reducing the resultant bending moment(s) of force, the openings formed with the non-conductive material desirably enable the structural member(s) to more effectively hold together the layers of the fuel cell assembly.

Figure 6:
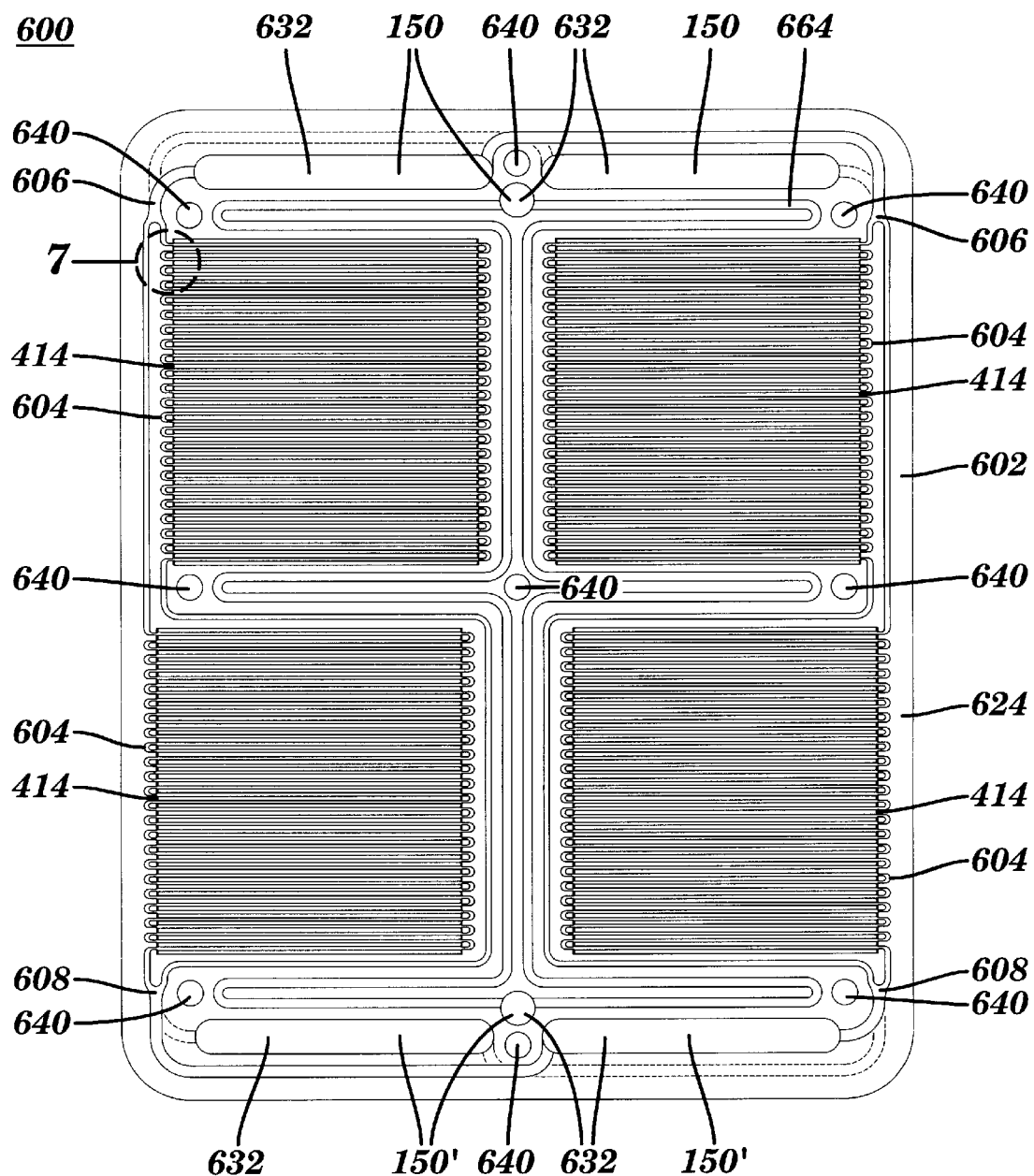
FIG. 6 is a plan view of a second exemplary embodiment of the fluid flow plate of FIG. 2, illustrating the fluid flow plate having multiple conductive members and non-conductive material, in accordance with the principles of the present invention.
Figure 7:
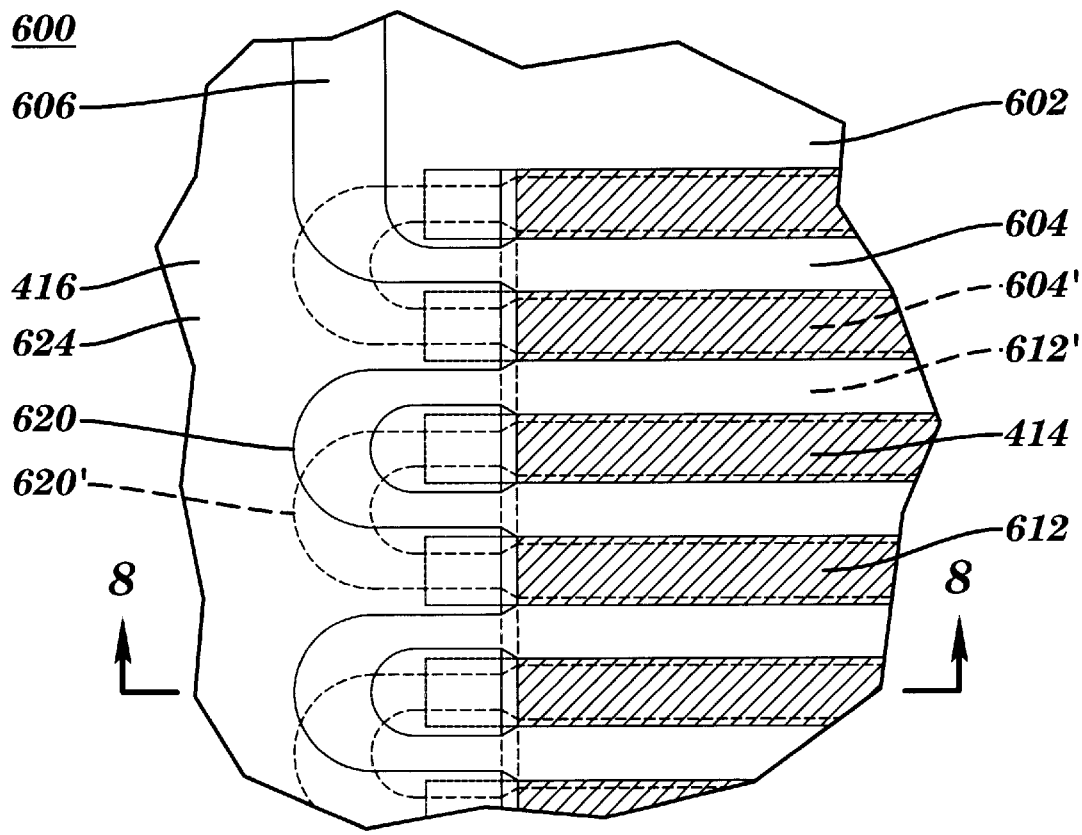
FIG. 7 is a magnified, cutaway, sectional, partial, plan view directed at the region of the fluid flow plate of FIG. 6 indicated by reference numeral 7.
Figure 8:
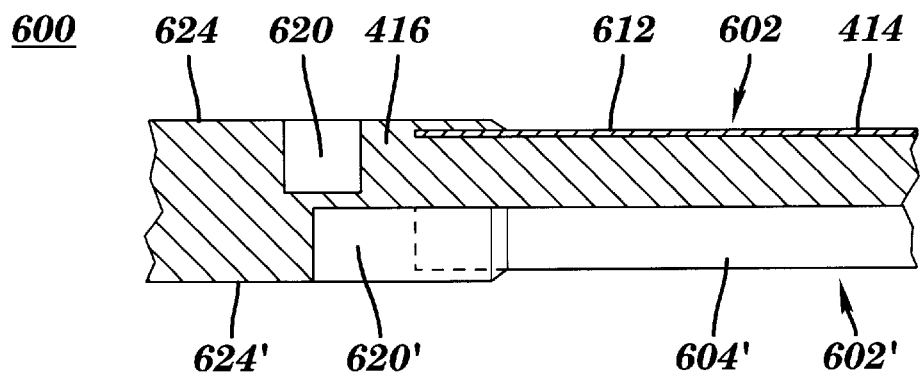
FIG. 8 is a cutaway, sectional, partial view directed substantially along line 8—8 of FIG. 7.

As a second exemplary embodiment, FIGS. 6–8 depict fluid flow plate 600 having first face 602 with flow channel 604 thereon, and second face 602' with flow channel 604' thereon.

In a preferred embodiment, non-conductive material 416 cooperates with multiple instances of conductive member 414 to form multiple instances of flow channel 604 on fluid flow face 602, with port(s)/inlet(s) 606 and port(s)/outlet(s) 608 in fluid communication with corresponding fluid manifolds 150 and 150', as depicted in FIG. 6.

Also, non-conductive material(s) 416 can form a turn 620, 620' (FIGS. 7–8) and/or any number of additional geometric feature(s) for fluid flow plate 600. In one example, the non-conductive material(s) form a portion of periphery 624, including orifices 632 for manifolds 150 and 150' and openings 640 for receiving therethrough structural members 116 (FIG. 1), where the non-conductive material(s) further serve to electrically isolate the structural members from conductive member(s) 414. As mentioned above, the structural members can therefore be positioned more interiorly in fuel cell assembly 100, for advantageous decrease of bending moment(s) for layer(s) 118 of fuel cell assembly 100.

As yet another example, non-conductive material(s) 416 enable formation of flow channels 604 on a given face 602 for carrying any number of fluids, which may include, for instance, reactant(s), humidifier(s), and/or product(s), with any desired isolation and/or commingling thereof, in addition to further flow channels 664, which may advantageously service, for example, coolant, all having desired fluid communication with appropriate fluid manifolds 150, 150', as depicted in FIG. 6.

Referring to FIGS. 7–8, conductive member 414 serves to provide an electrical path between faces 602 and 602' of fluid flow plate 600. In one example, land(s) 612 on face 602 provide contact(s) which are electrically coupled with corresponding land(s) 612' on face 602', for conduction of electrical current generated by fuel cell assembly 100.

Exemplary positioning for non-conductive material 416 is now described. In one example, as depicted in FIGS. 7–8, the non-conductive material, in addition to forming a periphery 624 of fluid flow plate 600, is distributed evenly for formation of the bottoms for flow channel(s) 604, for example, so the brace provides immediate support at locations throughout the flow channel(s).

Figure 9:
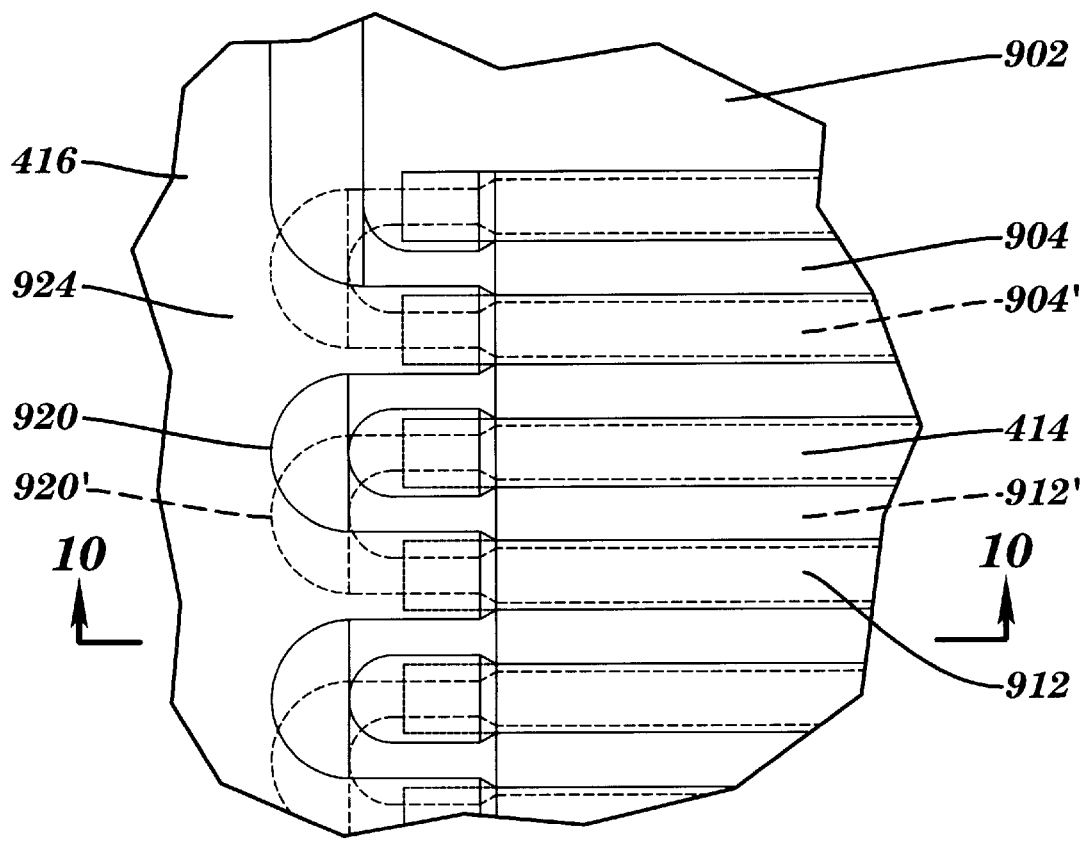
FIG. 9 is a magnified, cutaway, sectional, partial, plan view of a third exemplary embodiment of the fluid flow plate of FIG. 2, illustrating the fluid flow plate having a conductive member and non-conductive material, in accordance with the principles of the present invention.
Figure 10:
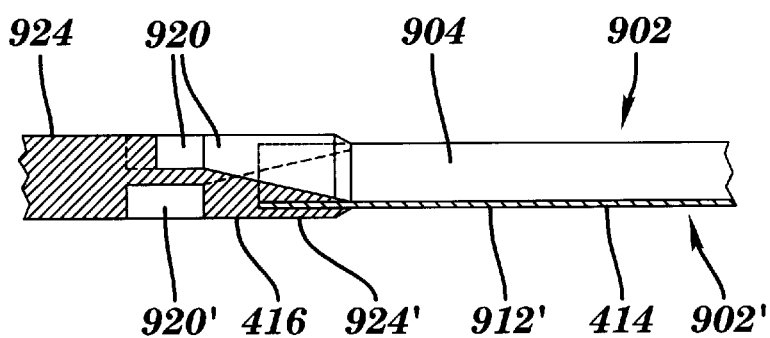
FIG. 10 is a cutaway, sectional, partial view directed substantially along line 10—10 of FIG. 9.

In another example, as depicted in FIGS. 9–10 for a third exemplary embodiment, namely, fluid flow plate 900, non-conductive material 416 is distributed to a preselected extent to uniformly form the bottom(s) for flow channel(s) 904, 904' just proximate the end(s), where the non-conductive material further forms portion(s) of periphery 924 of the fluid flow plate, for example, to minimize weight and/or use of material resources for employing the non-conductive material in formation of the brace for conductive member 414.

For illustrative purposes, fluid flow plate 900 is depicted with first face 902 having flow channel 904 thereon, and second face 902' having flow channel 904' thereon. Non-conductive material 416 can form a turn 920, 920' (FIGS. 9–10) and/or any number of additional geometric feature(s) for the fluid flow plate.

Referring to FIGS. 9–10, conductive member 414 serves to provide an electrical path between faces 902 and 902' of fluid flow plate 900. In one example, land(s) 912 on face 902 provide contact(s) which are electrically coupled with corresponding land(s) 912' on face 902', for conduction of electrical current generated by fuel cell assembly 100.

Further referring to FIGS. 7–10, non-conductive material (s) 416 can also serve to envelope the portions of a given land as it extends transversely toward periphery 624 (FIG. 7), 924 (FIG. 9) of the fluid flow face, thereby advantageously providing a hermetic seal with, in addition to forming a brace for, the corresponding flow channel(s), in accordance with the principles of the present invention. In one example, the non-conductive material(s) may include a first (e.g., inner) portion and a second (e.g., outer) portion, where the first portion of the non-conductive material(s) may serve to form a seal between conductive member(s) 414 and the second portion of the non-conductive material(s).

So, non-conductive material 416 advantageously serves to stabilize and preserve the structural integrity of the flow channel(s). Referring to FIGS. 4–5, for example, the non-conductive material forms a brace for the flow channel(s), through crosswise lodgement in intermediate channel section(s) 410 and integration with a periphery 424 of fluid flow plate 400. That is, conductive member 414, which represents a heavy and/or expensive material resource, can be formed with a decreased thickness, for advantageous savings, since the non-conductive material, which represents a less heavy and/or less expensive material resource, and/or even a light and/or inexpensive material resource, serves to provide compensating support against a tendency of the flow channel(s) toward undesirable flimsiness, owing to the decreased thickness of the conductive member. Moreover, the conductive member can be formed with a simple geometry, where desired complexity in geometry for the flow channel(s) and/or other feature(s) of the fluid flow plate is easily formable with the non-conductive material.

Figure 11:
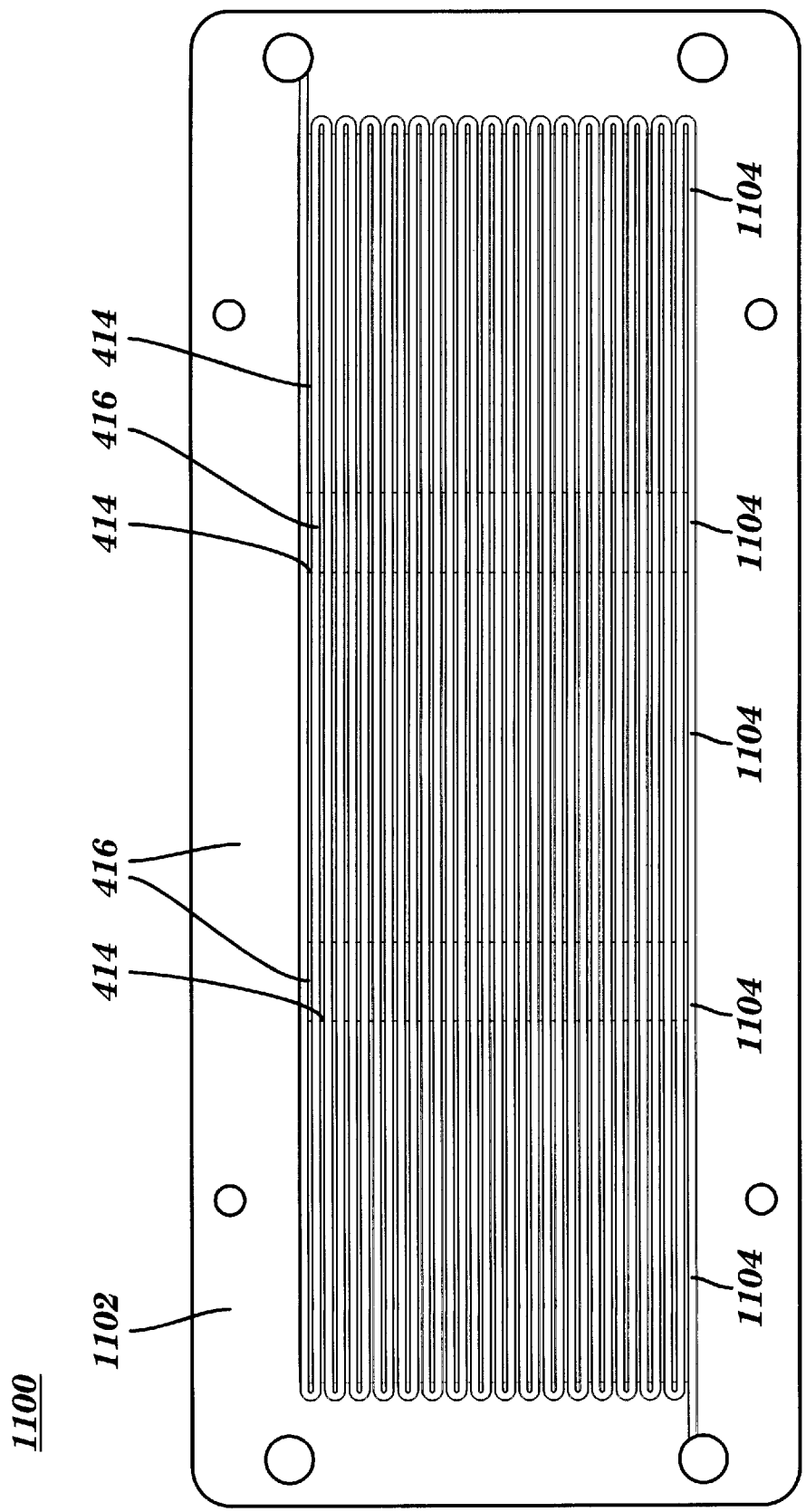
FIG. 11 is a plan view of a fourth exemplary embodiment of the fluid flow plate of FIG. 2, illustrating the fluid flow plate having multiple conductive members and non-conductive material, in accordance with the principles of the present invention.

As will be appreciated by those skilled in the art, the electrical isolation provided by non-conductive material 416 for the multiple instances of conductive member 414 depicted in FIG. 6 for fluid flow plate 600, and as depicted in FIG. 11 for a fourth exemplary embodiment, namely, fluid flow plate 1100, advantageously enables compact service and/or formation of separate active areas within layer(s) 118 (FIG. 1) of fuel cell assembly 100. As depicted in FIG. 11, the non-conductive material can enable continuous fluid communication among separate portion(s) of distinct sections of flow channel 1104 on face 1102, formed in cooperation with the individual conductive members 414.

Furthermore, non-conductive material 416, in accordance with the present invention, can enable many advantageous gasketing schemes with benefits such as lowered cost, increased simplicity, and/or increased robustness for fuel cell assembly 100. For example, the non-conductive material of successive fluid flow plates can be ultrasonically welded together, or to other material(s). One could, for instance, apply friction welding to hard plastic which serves as the non-conductive material.

Figure 12:
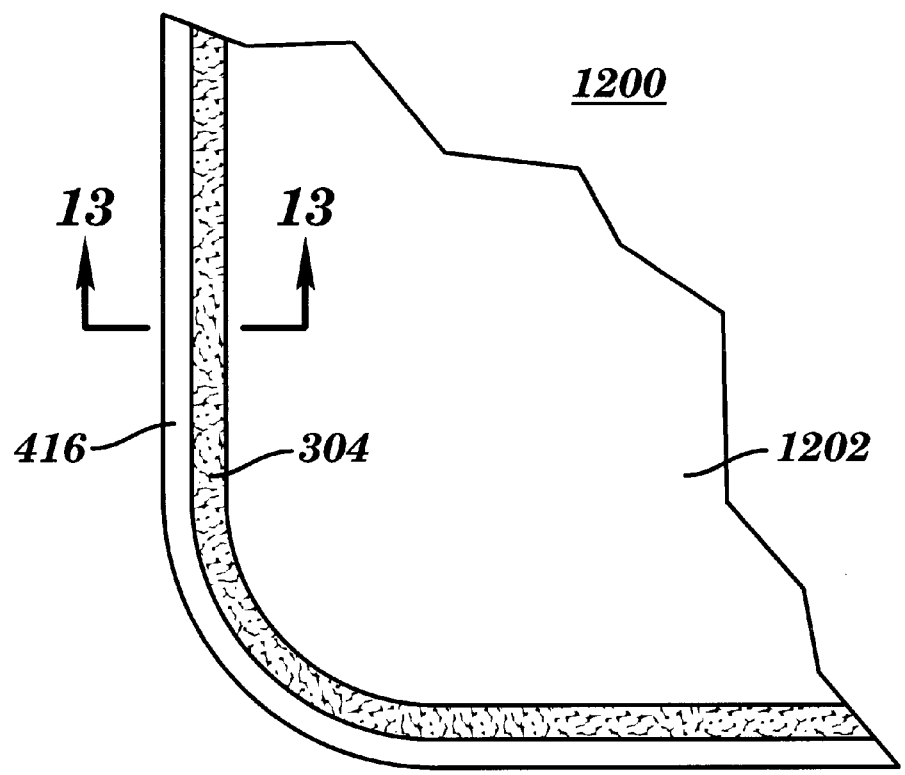
FIG. 12 is a cutaway, sectional, partial, plan view of a fifth exemplary embodiment of the fluid flow plate of FIG. 2, illustrating one example of a gasketing scheme for the fluid flow plate, in accordance with the principles of the present invention.
Figure 13:
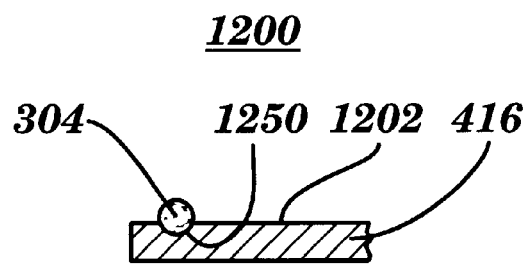
FIG. 13 is a cutaway, sectional, partial view directed substantially along line 13—13 of FIG. 12.

In another example, use of a sufficiently-compliant plastic as non-conductive material 416 can enable reduction or elimination of gasketing material(s) 304 (FIG. 3), as will be appreciated by those skilled in the art. As represented in FIGS. 8 and 10, formation of a periphery of a fluid flow plate to have raised portion(s) can enable use of thinner gasketing material(s), to conserve material resource therefor, as will be understood by those skilled in the art. Furthermore, as depicted in FIGS. 12–13, face 1202 of a fifth exemplary embodiment, namely, fluid flow plate 1200, may be formed with slot(s) 1250 adapted to receive press-in place gasket(s) serving as gasketing material(s) 304.

In yet another example, gasketing material(s) may include membrane 306, which may be received by a face of a fluid flow plate, for instance, in order to form a seal therewith.

In accordance with the principles of the present invention, design choice(s) may determine any appropriate configuration(s) for conductive member(s) 414 and non-conductive material(s) 416. Where land(s) are formed with the conductive material in order to provide an electrical pathway, conductivity may be enhanced by widening a portion of the land(s). However, one may wish to limit such widening of the land(s) in order to maintain exposure of the flow channel(s) to the gas diffusion layer, for instance, for communication of reactant fluid. As described herein, another aspect of the present invention provides advantageous avenue(s) and/or option(s) for addressing such considerations and/or enabling further enhancement(s).

Figure 14:
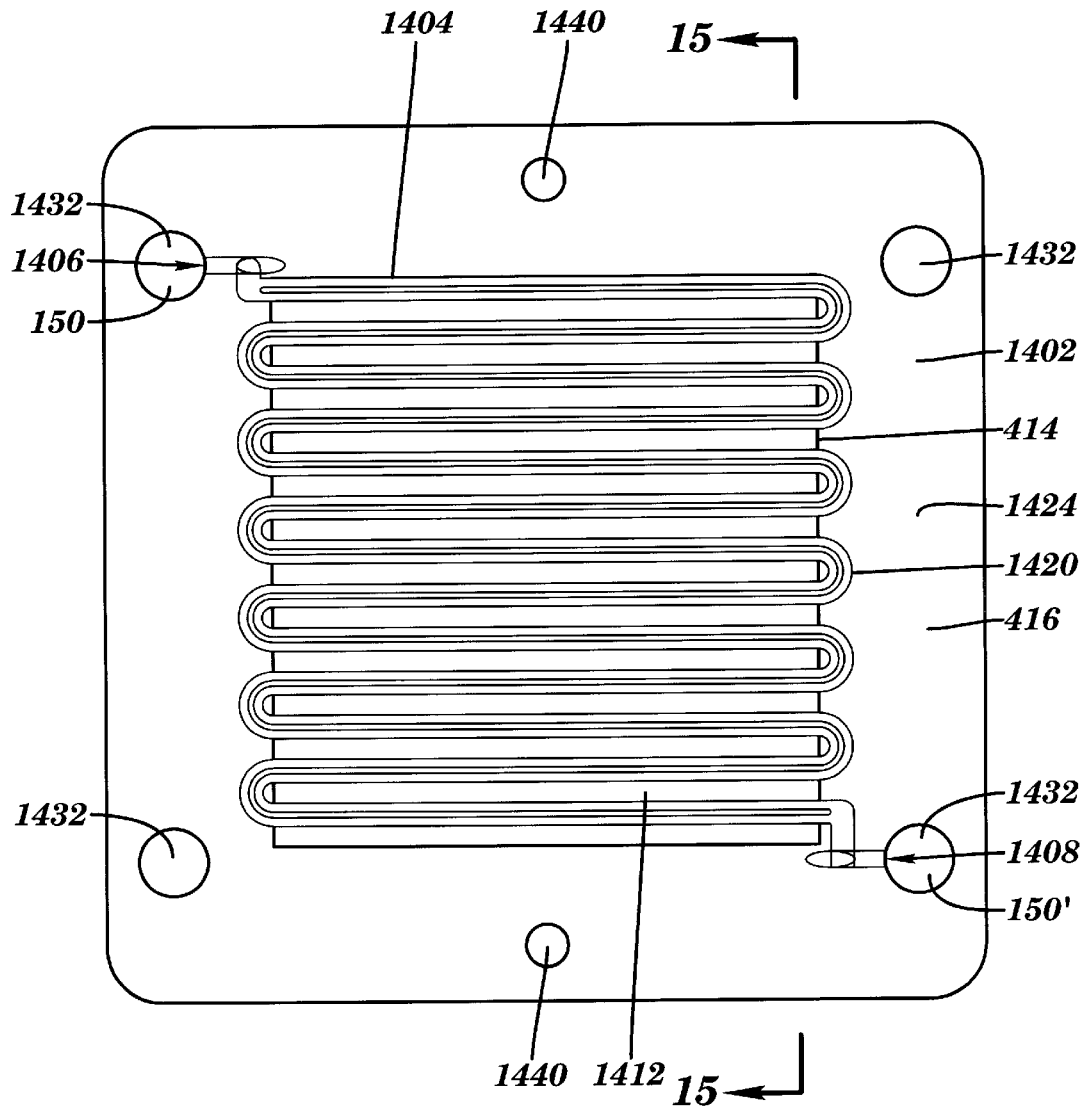
FIG. 14 is a plan view of a sixth exemplary embodiment of the fluid flow plate of FIG. 2, illustrating the fluid flow plate having a conductive member and non-conductive material, in accordance with the principles of the present invention.
Figure 15:
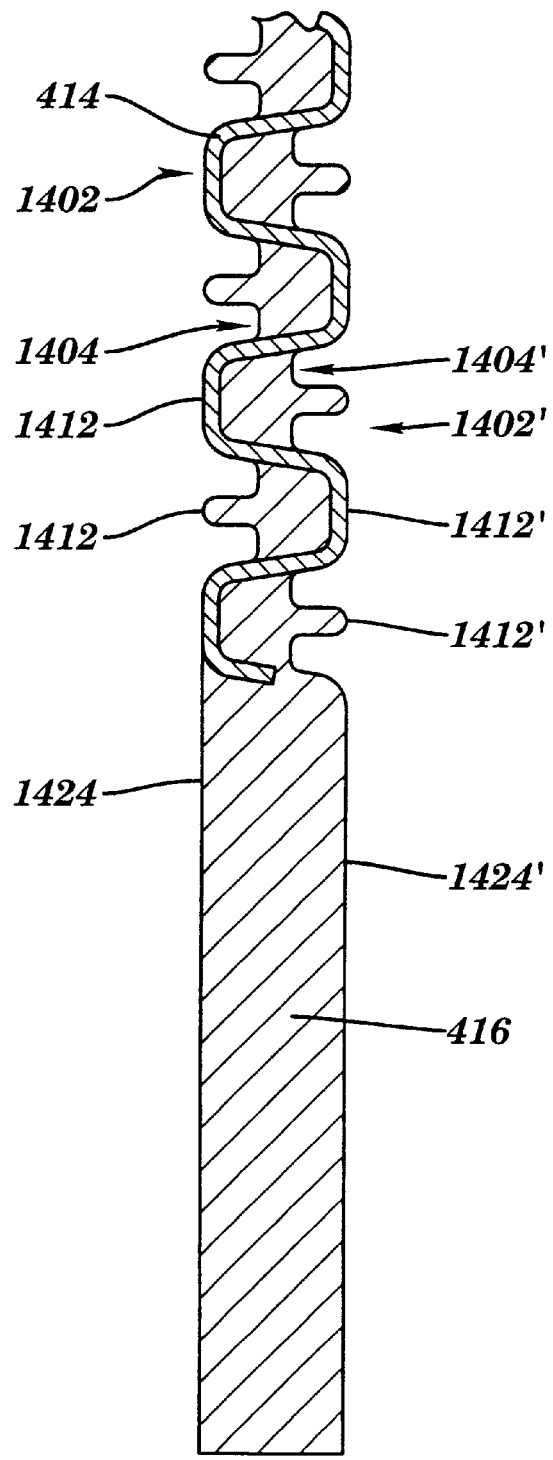
FIG. 15 is a magnified, cutaway, sectional, partial view directed substantially along line 15—15 of FIG. 14.

FIGS. 14–15 depict a sixth exemplary embodiment, namely, fluid flow plate 1400, in which non-conductive material 416 cooperates with conductive member 414 to form lands 1412. In particular, the conductive member can form a number of the lands, with a number of the remaining lands interspersed, located, and/or distributed thereamong being formed with the non-conductive material. As depicted in FIGS. 14–15, the lands may be formed alternately with the conductive material and the non-conductive material. That is, successive lands 1412 may alternate between being formed with the conductive member and the non-conductive material.

Exemplary additional features of fluid flow plate 1400 are now described. First face 1402 has flow channel 1404 thereon, and second face 1402' has flow channel 1404' thereon. Non-conductive material 416 preferably cooperates with conductive member 414 to form flow channel 1404 on fluid flow face 1402, with port/inlet 1406 and port/outlet 1408 in fluid communication with corresponding fluid manifolds 150 and 150', as depicted in FIG. 14.

Additionally, non-conductive material(s) 416 can serve to form any number of geometric feature(s) for fluid flow plate 1400. In one example, the non-conductive material forms a portion of periphery 1424, including orifices 1432 for manifolds 150 and 150' and openings 1440 for receipt therethrough of structural members 116 (FIG. 1), where the non-conductive material further serves to electrically isolate the structural members from conductive member 414. As described above, the structural members can therefore be positioned more interiorly in fuel cell assembly 100, for advantageous reduction of bending moments for layers 118 of fuel cell assembly 100.

Figure 16:
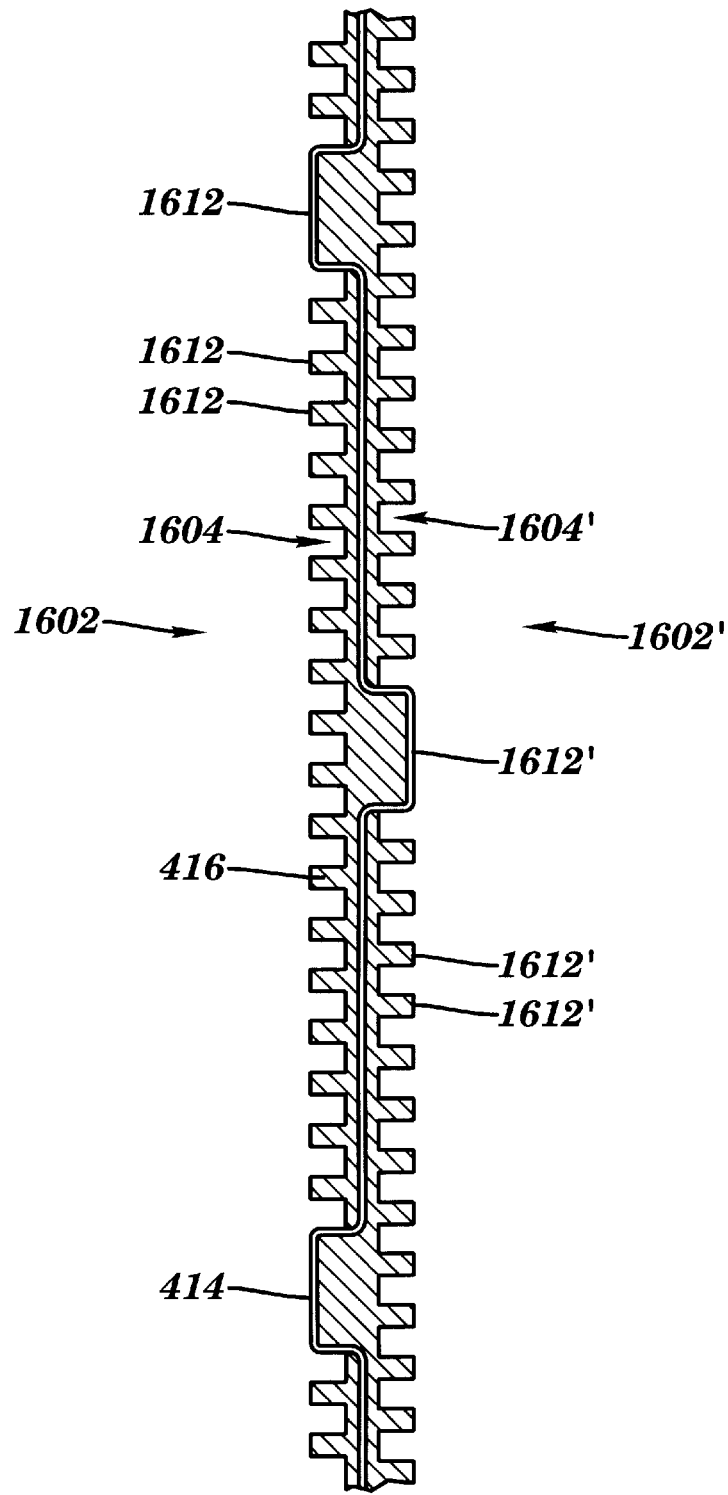
FIG. 16 is a cutaway, sectional, partial, side view of a seventh exemplary embodiment of the fluid flow plate of FIG. 2, illustrating the fluid flow plate having a conductive member and non-conductive material, in accordance with the principles of the present invention.

As yet another example, as depicted in FIG. 16 for a seventh exemplary embodiment, namely, fluid flow plate 1600, non-conductive material 416 forms multiple instances of land 1612 between given instances of the land formed by conductive member 414. As depicted in FIG. 16, the non-conductive material further cooperates with the conductive member to form flow channel(s) 1604 on fluid flow face 1602. The non-conductive material can serve to form any number of geometric feature(s) for the fluid flow plate.

Figure 17:
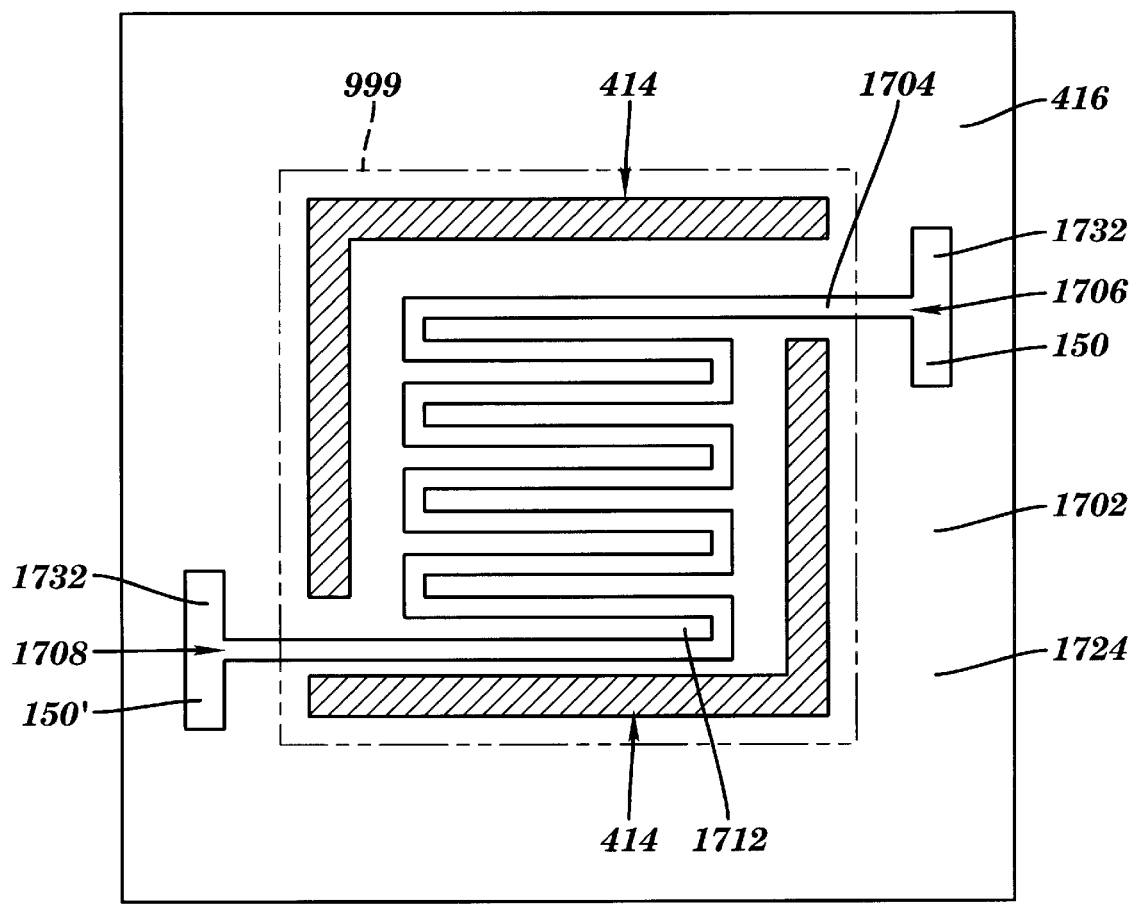
FIG. 17 is a plan representation of an eighth exemplary embodiment of the fluid flow plate of FIG. 2, illustrating the fluid flow plate having multiple conductive members and non-conductive material, and further illustrating a porous conductive layer in phantom, in accordance with the principles of the present invention.
Figure 18:
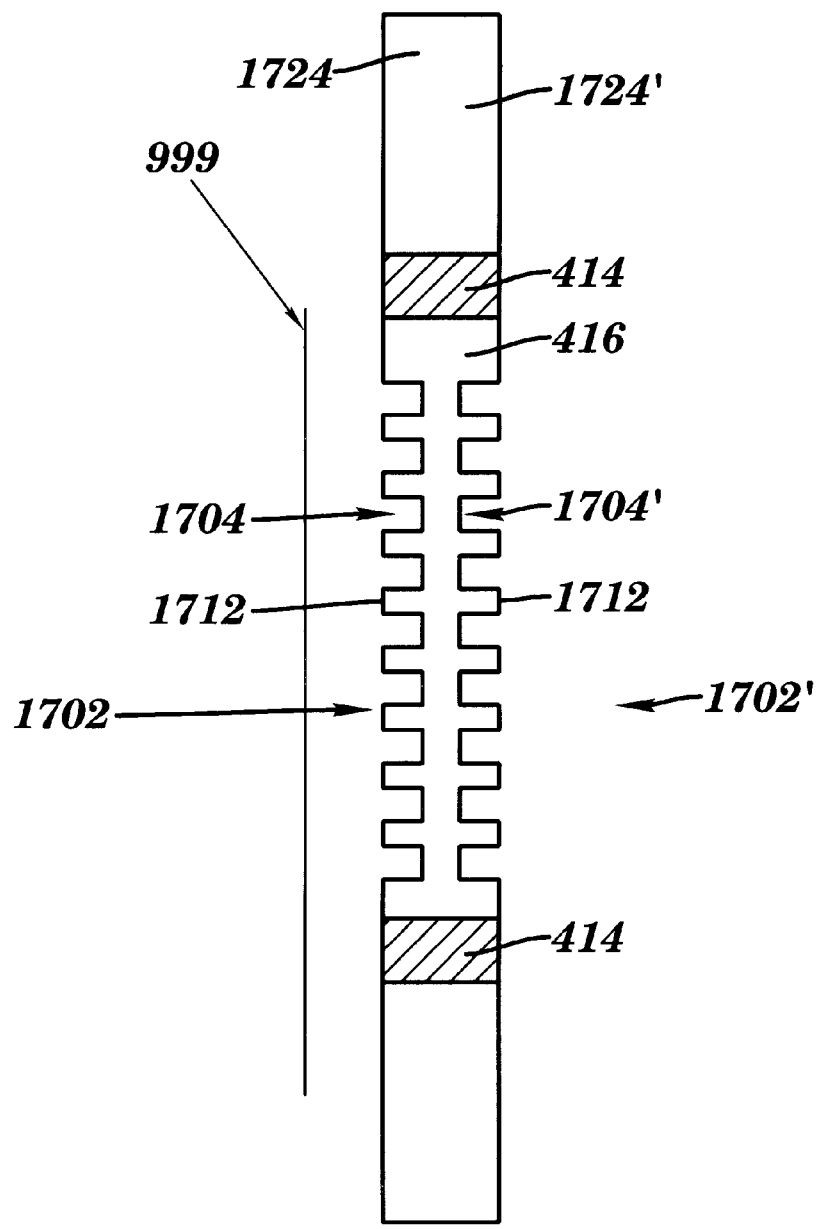
FIG. 18 is an exploded, cutaway, sectional, partial, side representation of the fluid flow plate and the porous conductive layer of FIG. 17.

As a still further example, as depicted in FIGS. 17–18 for an eighth exemplary embodiment, namely, fluid flow plate 1700, non-conductive material 416 forms, on fluid flow face 1702, lands 1712 as well as flow channel(s) 1704 therebetween and/or thereamong. In one example, conductive member 414 comprises insert(s) isolated from the flow channel(s).

Exemplary additional features of fluid flow plate 1700 are now described. First face 1702 has flow channel 1704 thereon, and second face 1702' has flow channel 1704' thereon. Non-conductive material 416 forms flow channel 1704 on fluid flow face 1702, with port/inlet 1706 and port/outlet 1708 in fluid communication with corresponding fluid manifolds 150 and 150', as depicted in FIG. 17. Furthermore, the non-conductive material can serve to form any number of geometric feature(s) for the fluid flow plate. In one example, the non-conductive material forms a portion of periphery 1724, including orifices 1732 for the fluid manifolds.

Moreover, as depicted in phantom in FIG. 17 and represented in FIG. 18, porous conductive layer 999 can serve to enhance electrical coupling of position(s) on flow face 1702 and, for instance, an adjacent gas diffusion layer, to conduct electricity generated by fuel cell assembly 100, as well as to permit fluid communication, for example, between flow channel(s) 1704 and the gas diffusion layer. In one example, the porous conductive layer can be formed with a screen and/or an expanded metal.

In accordance with the principles of the present invention, porous conductive layer 999 may be employed to enhance conductivity among any position(s) of a fluid flow plate and any position(s) of appropriate layer(s) 118 (FIG. 1). For example, exemplary fluid flow plates 1400 (FIG. 14) and 1600 (FIG. 16) may employ the porous conductive layer as desired to enhance conductivity for the lands formed with conductive member 414, in view of the lands formed with non-conductive material 416.

So, aspect(s) of conductive member(s) 414 and non-conductive material(s) 416 of the present invention enable flow channel(s) and/or other geometric feature(s) to be formed to optimize, for example, fluid(s) service and/or structural support, while conductivity remains. In this regard, exemplary manifolding and structural support have been discussed above. Now are provided examples concerning fluid(s) service within a fuel cell 300 (FIG. 3).

For purposes of illustration, exemplary optimization(s) of fluid(s) service, such as for membrane 306 (FIG. 3), are now described. For example, one could employ non-conductive material 416 to form a single wide-open flow channel on a fluid flow face, where conductive member 414 could be configured to provide conductivity thereabout and/or therearound.

Figure 19:
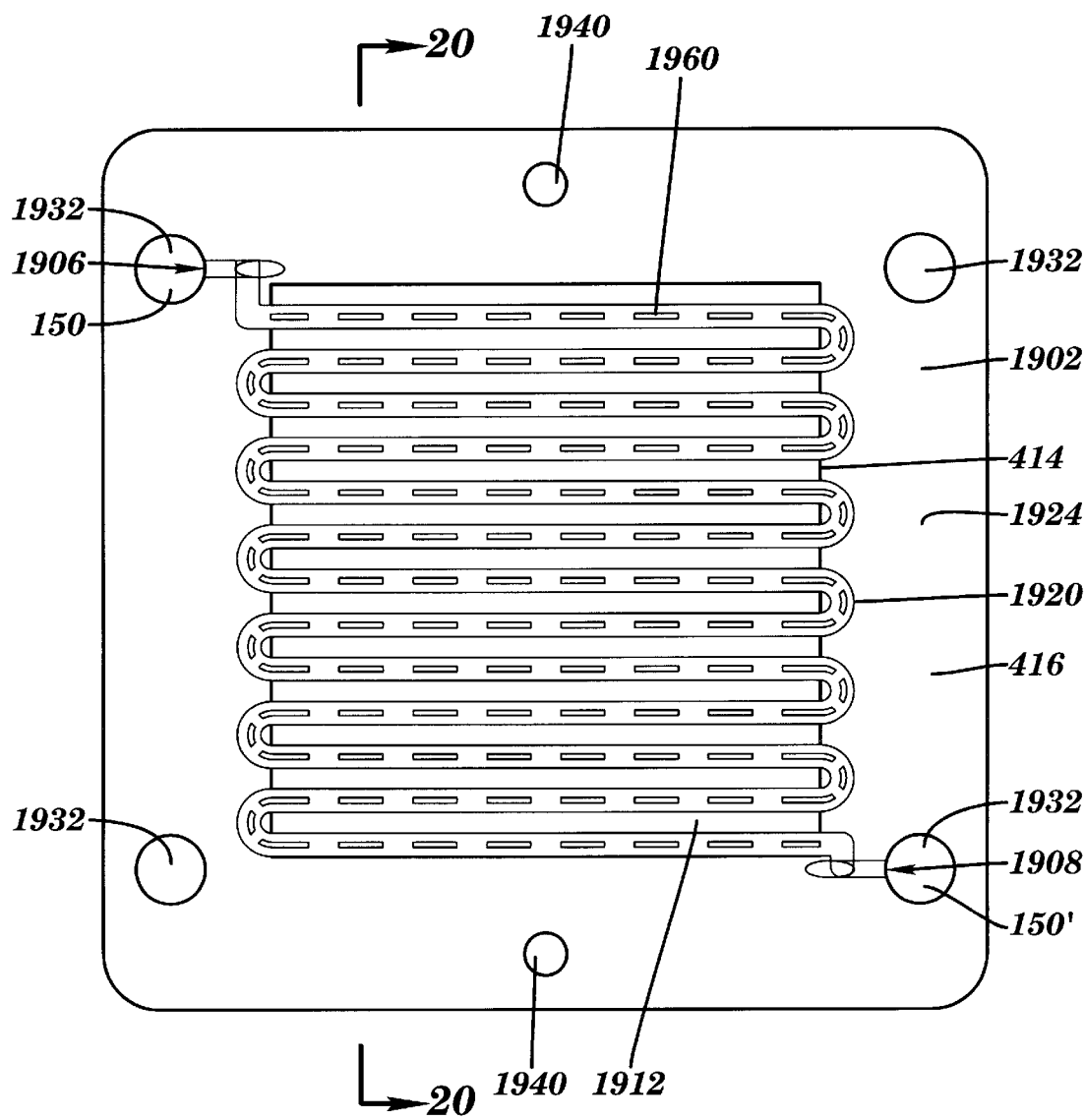
FIG. 19 is a plan view of a ninth exemplary embodiment of the fluid flow plate of FIG. 2, illustrating the fluid flow plate having a conductive member and non-conductive material, in accordance with the principles of the present invention.
Figure 20:
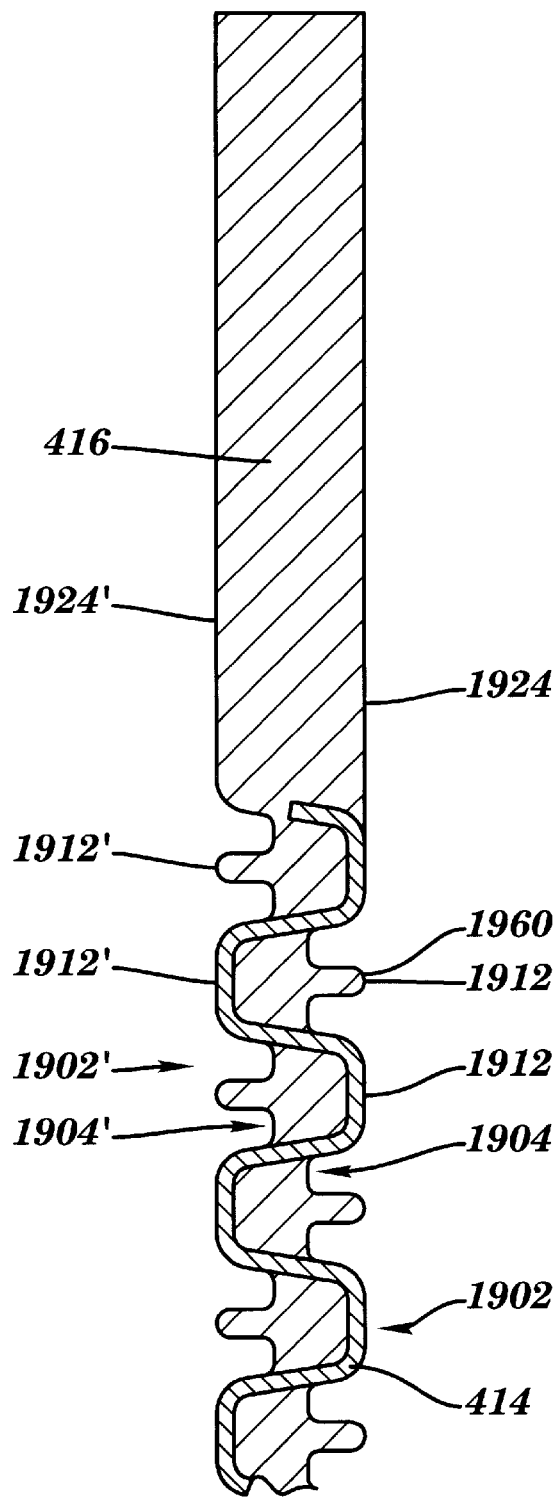
FIG. 20 is a magnified, cutaway, sectional, partial view directed substantially along line 20—20 of FIG. 19.

FIGS. 19–20 depict a ninth exemplary embodiment, namely, fluid flow plate 1900, in which non-conductive material(s) 416 cooperate with conductive member(s) 414 to form lands 1912. In particular, the conductive member(s) can form a number of the lands, with a number of the remaining lands interspersed, located, and/or distributed thereamong being formed with the non-conductive material(s). In one aspect, the non-conductive material(s) may form certain instance(s) of the lands with minimal cross-sectional width(s). For example, certain land(s) may be formed with the non-conductive material(s) to resemble "tent pole(s)" 1960, as depicted in FIGS. 19–20. The "tent pole(s)" may, for instance, serve to hold an adjacent gas diffusion layer out of flow channel(s) 1904, 1904'. Furthermore, the conductive member(s) can provide conductivity about and/or around the "tent pole(s)."

Exemplary additional features of fluid flow plate 1900 are now described. First face 1902 has flow channel 1904 thereon, and second face 1902' has flow channel 1904' thereon. Non-conductive material(s) 416 preferably cooperate with conductive member(s) 414 to form flow channel(s) 1904 on fluid flow face 1902, with port(s)/inlet(s) 1906 and port(s)/outlet(s) 1908 in fluid communication with corresponding fluid manifolds 150 and 150', as depicted in FIG. 19.

Moreover, non-conductive material(s) 416 can serve to form any number of geometric feature(s) for fluid flow plate 1900. In one example, the non-conductive material(s) form a portion of periphery 1924, including orifices 1932 for manifolds 150 and 150' and openings 1940 for receipt therethrough of structural members 116 (FIG. 1), where the non-conductive material(s) further serve to electrically isolate the structural members from conductive member(s) 414. As described above, the structural members can therefore be positioned more interiorly in fuel cell assembly 100, for advantageous reduction of bending moments for layers 118 of fuel cell assembly 100.

Figure 21:
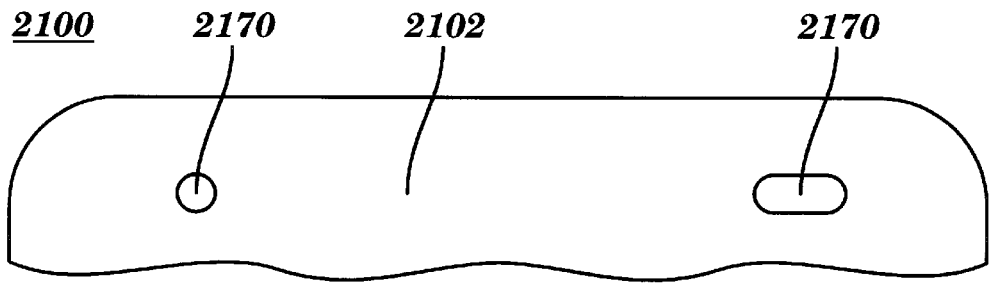
FIG. 21 is a cutaway, sectional, partial, plan view of a tenth exemplary embodiment of the fluid flow plate of FIG. 2, illustrating one example of an aligning feature for the fluid flow plate, in accordance with the principles of the present invention.
Figure 22:
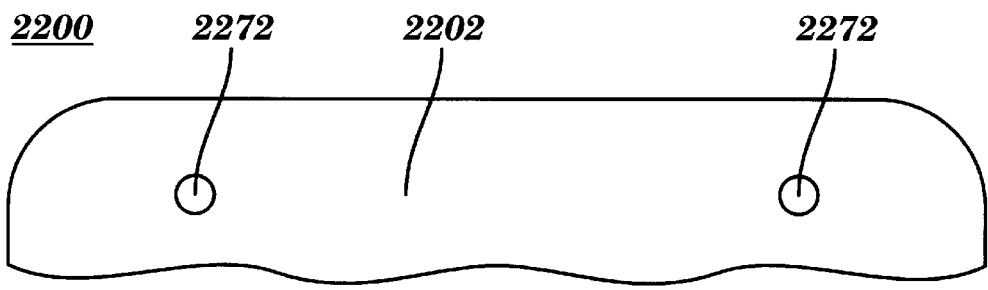
FIG. 22 is a cutaway, sectional, partial, plan view of an eleventh exemplary embodiment of the fluid flow plate of FIG. 2, illustrating another example of an aligning feature for the fluid flow plate, in accordance with the principles of the present invention.
Figure 23:
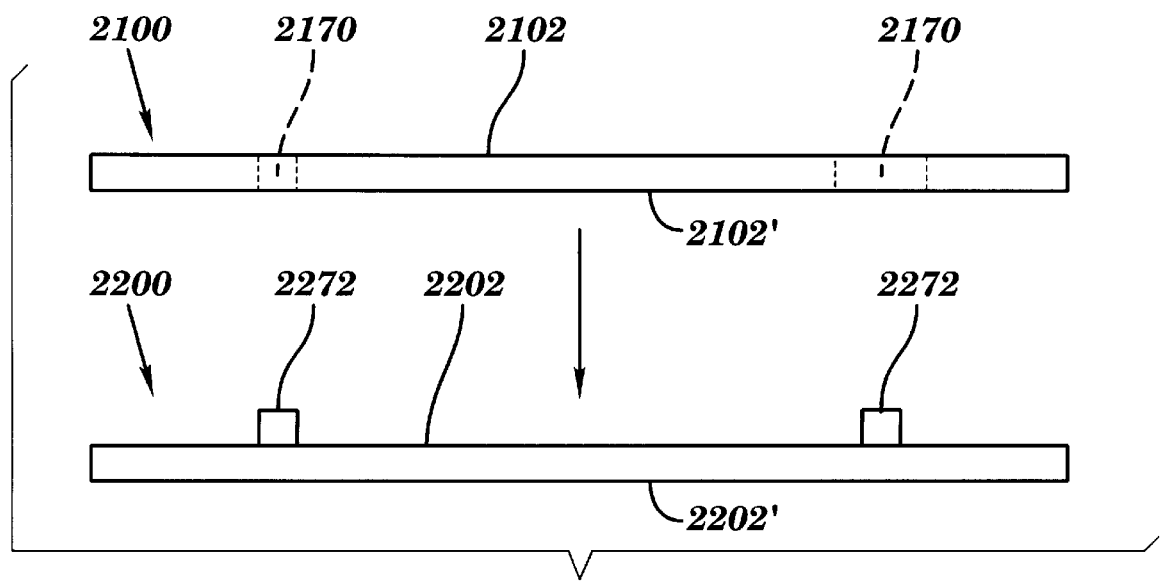
FIG. 23 is an exploded, cutaway, side representation of the fluid flow plates of FIGS. 21–22.

As depicted in FIGS. 21–23, face 2102, 2102' of a tenth exemplary embodiment, namely, fluid flow plate 2100, and face 2202, 2202' of an eleventh exemplary embodiment, namely, fluid flow plate 2200, may be formed with hole(s) 2170 and/or pin(s) 2272. The hole(s) may be adapted to receive the pin(s). In accordance with the principles of the present invention, non-conductive material(s) can serve to form the hole(s), the pin(s), and/or any number of other geometric feature(s) for the fluid flow plates. In an alternative embodiment, one or more of the pin(s) may be formed with conductive material(s), where such pin(s) preferably would be electrically insulated with non-conductive material (s). In one example, the pin(s) serve to position the hole(s), and/or vice versa, for instance, so flow field(s) and/or manifold area(s) of the fluid flow plates are in alignment with each other transversely. Any shape(s) and/or style(s) could be employed for the pin(s) and/or the hole(s), as will be understood by those skilled in the art. Further, design choice(s) allow selection and/or determination of clearance (s) between the pin(s) and the hole(s), such as for a desired alignment accuracy.

As depicted in FIGS. 24–25, a twelfth exemplary embodiment, namely, fluid flow plate 2400, and a thirteenth exemplary embodiment, namely, fluid flow plate 2500, may be formed with feature(s) which allow attachment and/or latching of the fluid flow plates, and/or compression and/or clamping of component(s) 2450 such as an MEA, a gas diffusion layer, and/or gasketing material(s). In one example, one or more latches such as two-eared pin(s) 2472 and/or round pin(s) 2474 may be employed with hole(s) 2470. The hole(s) may be adapted to receive the pin(s). For instance, the component(s) may be placed between the fluid flow plates. Also, the fluid flow plates may be aligned and/or forced together. A given pin 2472, 2474 may be formed with compliancy which allows the fluid flow plates to be forced together. For example, the given pin may contract during insertion through a certain hole 2470, and then expand after passing through the certain hole, such as for providing a lock. Any of a number of similar feature(s) may be provided for such a latching function, as will be appreciated by those skilled in the art. Furthermore, non-conductive material(s) can serve to form any of these and/or other geometric feature(s) for the fluid flow plates, in accordance with the principles of the present invention.

As described above, aspect(s) of conductive member(s) 414 and non-conductive material(s) 416 of the present invention also enable the flow field to be optimized for sealing, such as gasketing, joining, and/or manifolding.

The subject invention can advantageously decrease weight as well as cost of a fluid flow plate by including non-conductive material(s) 416 instead of conductive member(s) 414 in certain location(s) By decreasing density of the fluid flow plate through inclusion of the non-conductive material(s), one can desirably increase performance of, for example, automobiles which employ fuel cell assembly 100. That is, lightening of the fuel cell assembly translates into less energy expended in transporting the fuel cell assembly in order to gain operational benefits of fuel cells 300. Those skilled in the art will appreciate the efficiencies possible from use of the present invention in a wide range of vehicular and/or other desired applications.

Non-conductive material 416 desirably serves to provide structural rigidity and/or strength to a fluid flow plate. In one aspect, non-conductive material fortifies or maintains the integrity of flow channels despite increased compression applied in a longitudinal direction of fuel cell assembly 100, notwithstanding any occurrence(s) of conductive member 414 having a decreased thickness and/or presence therein. This longitudinal compression of the fluid flow plate and fuel cell stack 100 advantageously conserves volume therein, or decreases volume thereof, at a certain power output, that is, with a certain number of fuel cells 300. Moreover, such longitudinal stack compression desirably increases power output from a particular volume of the stack, namely, by increasing the number of fuel cells 300 in that particular volume. These and other advantages of the present invention will be appreciated by those skilled in the art.

In one aspect, flow channel(s) 204 may be formed with variable cross section(s), in accordance with the principles of the subject invention.

Furthermore, desirable feature(s) and/or structure(s), in addition to those discussed herein, can easily be incorporated into non-conductive material 416, such as at a periphery of a given fluid flow plate constructed in accordance with the present invention.

Where a plurality of flow channels carry certain fluid on a given fluid flow face between entry and exit fluid manifolds, each of the plurality of flow channels is preferably formed having substantially the same length. By designing the flow channels to have substantially identical length, one largely prevents variance in pressure drop among the flow channels, thereby promoting uniform and equal flow as well as superior overall performance. Further, any variance in cross-section along a given flow channel, such as by positioning of non-conductive material 416 relative to conductive member 414, is preferably substantially duplicated for companion flow channel(s) on the same fluid flow face which carry the same fluid for a same fuel cell.

A given fluid flow plate of the present invention which conducts fluids on both faces might be configured so the fluids have, for example, parallel flow or counter flow among various (e.g., generally serpentine) flow channels. In particular, a parallel flow configuration might generally transversely align flow on the opposing faces by positioning corresponding first and second inlets at opposite sides of a first corner of the plate, and corresponding first and second outlets at opposite sides of a generally diametrically opposed second corner of the plate. Further, a counter flow design might provide flow in generally transversely opposite directions on the opposing faces by placing first inlet(s) and second outlet(s) at opposite sides of a first corner of the plate, and first outlet(s) and second inlet(s), respectively, at opposite sides of a generally diametrically opposed second corner of the plate.

Operation of a fuel cell assembly of the present invention can include periods or intervals of action and inaction, such as an active use followed by idling. Also, the fuel cell assembly can be employed for varied (e.g., automotive to aerospace to industrial) applications, in various environments.

Numerous alternative embodiments of the present invention exist. Fluid flow plate 200 and/or fluid manifold(s) 150, 150' could serve any desired function with any appropriate orientation, shape, and/or formation in any position of fuel cell assembly 100. Further, fluid flow face 202 could easily have any number of flow channels 204. Any flow channel 204 could easily have any appropriate shape or structure. Also, flow channel(s) 204 could easily be configured to deviate, to any desired degree, from parallel alignment and/or serpentine design. Moreover, any of port(s)/inlet(s) 206 and/or port(s)/outlet(s) 208 might employ any mechanism for fluid communication between appropriate flow channel(s) 204 and fluid manifold(s) 150, 150'. Design choices permit variation in construction technique(s) and/or material(s) for any portion of fluid flow plate 200 and/or fuel cell assembly 100. Furthermore, fluid flow plate(s) 200 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channels wherein said first face comprises a first flow field face, and wherein said nonconductive material comprises a portion of said first flow field face.

2. The fluid flow plate of claim 1, wherein said brace includes a portion of said non-conductive material mechanically engaged with first and second location said conductive member.

3. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said brace includes a portion of said non-conductive material lodged crosswise within said flow channel.

4. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said brace includes a portion of said non-conductive material enveloping a portion of said first land.

5. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said non-conductive material forms a seal with said portion of said flow channel.

6. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said portion of said flow channel comprises a first portion of said flow channel, wherein said conductive member forms said first portion, and wherein said nonconductive material forms a second portion of said flow channel.

7. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said non-conductive material forms at least one of a turn and a port for said flow channel.

8. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said non-conductive material forms a portion of a periphery of said first face.

9. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said non-conductive material forms a portion of said first face adapted to serve as gasketing material for said fuel cell assembly.

10. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said non-conductive material forms a portion of said first face adapted to receive gasketing material for said fuel cell assembly.

11. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said non-conductive material forms a first portion of said first face at least one of ultrasonically weldable and frictionally weldable to a second portion of a layer of said fuel cell assembly.

12. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said non-conductive material forms on said first face at least one of an orifice for a fluid manifold and an opening for a structural member for said fuel cell assembly.

13. The fluid flow plate of claim 1, wherein said at least one fluid includes at least one of reactant fluid, product fluid, and humidification fluid for a fuel cell of said fuel cell assembly.

14. The fluid flow plate of claim 13, wherein said fuel cell comprises a PEM fuel cell.

15. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said flow channel comprises a first flow channel and said at least one fluid comprises at least one first fluid, wherein said non-conductive material forms a portion of a second flow channel on said first face, and wherein said second flow channel is adapted to service at least one second fluid for said fuel cell assembly.

16. The fluid flow plate of claim 15, wherein said at least one second fluid includes at least one of reactant fluid, product fluid, humidification fluid and coolant.

17. The fluid flow plate of claim 1, wherein said first face includes a plurality of flow channels which are at least one of substantially parallel and substantially serpentine.

18. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said flow channel comprises a first flow channel, wherein said first face includes a second flow channel passing between said lands, and wherein said non-conductive material forms a portion of said second flow channel.

19. A fuel cell assembly fluid flow plate, comprising:
first and second faces;
a conductive member forming first and second lands on said first face, said first face including a flow channel passing between said lands, said flow channel adapted to service at least one fluid for a fuel cell assembly;
said conductive member forming an electrical path between said first land and a position on said second face, said electrical path adapted to conduct electrical current generated by said fuel cell assembly; and
non-conductive material forming a brace for a portion of said flow channel;
wherein said first face includes a third land located between said first and second lands, and wherein said non-conductive material forms a portion of said third land.

20. The fluid flow plate of claim 19, wherein said first land is adapted for electrical coupling with a porous conductive layer of said fuel cell assembly.

21. A fuel cell assembly fluid flow plate, comprising:
first and second faces;

a conductive member forming first and second lands on said first face, said first face including a flow channel passing between said lands, said flow channel adapted to service at least one fluid for a fuel cell assembly:

said conductive member forming an electrical path between said first land and a position on said second face, said electrical path adapted to conduct electrical current generated by said fuel cell assembly; and non-conductive material forming a brace for a portion of said flow channel;

wherein on said first face said non-conductive material forms first and second flow channel sections and a third land therebetween, and wherein said first flow channel section is adapted to service at least one fluid for said fuel cell assembly.

22. The fluid flow plate of claim 1, wherein said non-conductive material is injection-molded.

23. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a brace for a portion of said flow channel;

wherein said fluid flow plate is divided into multiple fluid flow sub-plates, each fluid flow sub-plate being electrically insulated from other fluid flow sub-plates of said multiple fluid flow sub-plates.

24. The fluid flow plate of claim 1, wherein said conductive member comprises a first conductive member, said electrical path comprises a first electrical path, and said position comprises a first position, and further comprising a second conductive member forming a second electrical path between a second position on said first face and a third position on said second face, said second electrical path adapted to conduct electrical current generated by said fuel cell assembly.

25. A fuel cell assembly fluid flow plate, comprising:

first and second faces;

said first face including non-conductive material, said non-conductive material forming first and second flow channel sections and a land therebetween, said first flow channel section adapted to service at least one fluid for a fuel cell assembly; and a conductive member forming an electrical path between a first position on said land on said first face and a second position on said second face, said electrical path adapted to conduct electrical current generated by said fuel cell assembly.

26. The fluid flow plate of claim 25, wherein said conductive member forms said electrical path at least one of about and around said first flow channel section.

27. The fluid flow plate of claim 25, wherein said first flow channel section is formed without said conductive member.

28. The fluid flow plate of claim 25, wherein said first flow channel section is adapted to optimize service of said at least one fluid for a membrane of said fuel cell assembly.

29. The fluid flow plate of claim 25, wherein said first and second flow channel sections comprise a flow channel for said fuel cell assembly.

30. The fluid flow plate of claim 25, wherein said first flow channel section comprises a first flow channel for said fuel cell assembly and said at least one fluid comprises at least one first fluid, and wherein said second flow channel section comprises a second flow channel adapted to service at least one second fluid for said fuel cell assembly.

31. The fluid flow plate of claim 30, wherein said at least one second fluid includes at least one of reactant fluid, product fluid, humidification fluid and coolant.

32. The fluid flow plate of claim 25, wherein said non-conductive material forms a portion of a periphery of said first face.

33. The fluid flow plate of claim 25, wherein said non-conductive material forms a portion of said first face adapted to serve as gasketing material for said fuel cell assembly.

34. The fluid flow plate of claim 25, wherein said non-conductive material forms a portion of said first face adapted to receive gasketing material for said fuel cell assembly.

35. The fluid flow plate of claim 25, wherein said non-conductive material forms a first portion of said first face at least one of ultrasonically weldable and frictionally weldable to a second portion of a layer of said fuel cell assembly.

36. The fluid flow plate of claim 25, wherein said non-conductive material forms on said first face at least one of an orifice for a fluid manifold and an opening for a structural member for said fuel cell assembly.

37. The fluid flow plate of claim 25, wherein said at least one fluid includes at least one of reactant fluid, product fluid, and humidification fluid for a fuel cell of said fuel cell assembly.

38. The fluid flow plate of claim 37, wherein said fuel cell comprises a PEM fuel cell.

39. The fluid flow plate of claim 25, wherein said first face includes a plurality of flow channels which are at least one of substantially parallel and generally serpentine.

40. The fluid flow plate of claim 25, wherein said land comprises a first land, wherein said first face includes a second land located between said first and second flow channel sections, and wherein said conductive member forms a portion of said second land.

41. The fluid flow plate of claim 25, wherein said conductive member is adapted for electrical coupling with a porous conductive layer of said fuel cell assembly.

42. The fluid flow plate of claim 25, wherein said conductive member comprises a first conductive member and said electrical path comprises a first electrical path, and further comprising a second conductive member forming a second electrical path between a third position on said first face and a fourth position on said second face, said second electrical path adapted to conduct electrical current generated by said fuel cell assembly.

43. The fluid flow plate of claim 25, wherein said non-conductive material forms a brace for a portion of said first flow channel section.

44. The fluid flow plate of claim 25, wherein said non-conductive material forms a seal with a portion of said first flow channel section.

45. The fluid flow plate of claim 25, wherein said land comprises a substantially cantilevered, non-peripheral formation.

46. The fluid flow plate of claim 25, wherein said non-conductive material is injection-molded.

47. The fluid flow plate of claim 25, wherein said fluid flow plate is divided into multiple fluid flow sub-plates, each fluid flow sub-plate being electrically insulated from other fluid flow sub-plates of said multiple fluid flow sub-plates.

48. A process for forming a simple structural aspect and a complicated structural aspect of a geometric feature on a face of a fluid flow plate, said plate formed with conductive material and non-conductive material, comprising the steps of:

forming said simple structural aspect with a first portion of said conductive material; and forming a periphery of said face with a second portion of said non-conductive material and without said conductive material, wherein said periphery includes said complicated structural aspect, and said complicated structural aspect includes a flow channel turn.

49. The process of claim 48, wherein said geometric feature comprises a flow channel, and wherein said complicated structural aspect further includes a port.

50. The process of claim 48, wherein said periphery forming includes forming at least one of an orifice for a fluid manifold and an opening for a structural member for said fuel cell assembly.

51. The process of claim 48, wherein said periphery forming comprises injection molding said second portion.

52. The process of claim 48, wherein said periphery forming includes forming a seal with said first portion.

53. The process of claim 48, wherein said periphery forming includes forming a brace for said first portion.

54. The process of claim 48, wherein at least one of said simple structural aspect and said complicated structural aspect comprises a specific component of said geometric feature.

55. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming a feature on said first face, wherein said non-conductive material is injection-molded.

56. The fluid flow plate of claim 55, wherein said fluid flow plate is divided into multiple fluid flow sub-plates, each fluid flow sub-plate being electrically insulated from other fluid flow sub-plates of said multiple fluid flow sub-plates.

57. The fluid flow plate of claim 55, wherein said conductive member comprises a first conductive member, said electrical path comprises a first electrical path, and said position comprises a first position, and further comprising a second conductive member forming a second electrical path between a second position on said first face and a third position on said second face, said second electrical path adapted to conduct electrical current generated by said fuel cell assembly.

58. The fluid flow plate of claim 55, wherein said feature comprises a means for aligning said plate with an adjacent plate of said fuel cell assembly.

59. The fluid flow plate of claim 55, wherein said feature comprises a means for maintaining clamping pressure on a component between said plate and an adjacent plate of said fuel cell assembly.

60. The fluid flow plate of claim 55, wherein said feature comprises a seal with a portion of said flow channel.

61. The fluid flow plate of claim 55, wherein said conductive member forms a first portion of said flow channel, and wherein said feature comprises a second portion of said flow channel.

62. The fluid flow plate of claim 55, wherein said feature comprises at least one of a turn and a port for said flow channel.

63. The fluid flow plate of claim 55, wherein said feature comprises a portion of a periphery of said first face.

64. The fluid flow plate of claim 55, wherein said feature comprises a portion of said first face adapted to serve as gasketing material for said fuel cell assembly.

65. The fluid flow plate of claim 55, wherein said feature comprises a portion of said first face adapted to receive gasketing material for said fuel cell assembly.

66. The fluid flow plate of claim 55, wherein said feature comprises a first portion of said first face at least one of ultrasonically weldable and frictionally weldable to a second portion of a layer of said fuel cell assembly.

67. The fluid flow plate of claim 55, wherein said at least one fluid includes at least one of reactant fluid, product fluid, and humidification fluid for a fuel cell of said fuel cell assembly.

68. The fluid flow plate of claim 57, wherein said fuel cell comprises a PEM fuel cell.

69. The fluid flow plate of claim 55, wherein said flow channel comprises a first flow channel and said at least one fluid comprises at least one first fluid, wherein said feature comprises a portion of a second flow channel on said first face, and wherein said second flow channel is adapted to service at least one second fluid for said fuel cell assembly.

70. The fluid flow plate of claim 55, wherein said feature comprises an orifice for a fluid manifold for said fuel cell assembly.

71. The fluid flow plate of claim 55, wherein said feature comprises an opening for a structural member for said fuel cell assembly.

72. A fuel cell assembly fluid flow plate, comprising:

first and second faces;

a conductive member forming first and second lands on said first face, said first face including a flow channel passing between said lands, said flow channel adapted to service at least one fluid for a fuel cell assembly;

said conductive member forming an electrical path between said first land and a position on said second face, said electrical path adapted to conduct electrical current generated by said fuel cell assembly; and non-conductive material forming at least one of: means for aligning said fluid flow plate with an adjacent plate of said fuel cell assembly, and means for maintaining clamping pressure on a component between said fluid flow plate and an adjacent plate of said fuel cell assembly.

73. The fluid flow plate of claim 72, wherein said means for aligning includes at least one of a detent, a knob, and a hole.

74. The fluid flow plate of claim 72, wherein said non-conductive material forms at least one of a means for combining and a means for attaching said fluid flow plate with said adjacent plate.

75. The fluid flow plate of claim 72, wherein said non-conductive material is injection-molded.

76. The fluid flow plate of claim 72, wherein said means for maintaining clamping pressure includes a latch.

77. The fluid flow plate of claim 72, wherein said component includes at least one of a membrane electrode assembly and a gas diffusion layer.

78. The fluid flow plate of claim 71, further comprising second conductive material comprising at least one of a means for combining and a means for attaching said fluid flow plate with said adjacent plate.

79. The fluid flow plate of claim 78, wherein said non-conductive material and said second conductive material comprise said at least one of said means for combining and said means for attaching said fluid flow plate with said adjacent plate.

80. A fuel cell assembly fluid flow plate, comprising:

first and second exterior faces;

a member having a first surface with an indentation thereon for forming a portion of a first flow channel for carrying a first fluid for a fuel cell assembly, said first flow channel formed on said first exterior face;

said member having a second surface with a protuberance thereon for forming a portion of a second flow channel for carrying a second fluid for said fuel cell assembly, said second flow channel formed on said second exterior face;

wherein said indentation forms said protuberance; and wherein at least one of said portion of said first flow channel and said portion of said second flow channel comprises non-conductive material.

81. The fluid flow plate of claim 80, wherein said non-conductive material comprises a portion of a periphery of at least one of said first and second exterior faces.

82. The fluid flow plate of claim 80, wherein said non-conductive material comprises at least one of a turn and a port for at least one of said first and second flow channels.

83. The fluid flow plate of claim 80, wherein said member comprises a conductive member.

84. The fluid flow plate of claim 80, wherein at least one of said first and second exterior faces comprises a flow field face.

85. A fuel cell assembly fluid flow plate, comprising:

first and second faces;

said first face including non-conductive material, said non-conductive material forming first and second flow channel sections and a land therebetween, said first flow channel section adapted to service at least one fluid for a fuel cell asssembly, said non-conductive material extending from said first face to said second face; and a conductive member forming an electrical path between a first position on said first face and a second position on said second face, said eletrical path adapted to conduct electrical current generated by said fuel cell assembly.

* * * * *

UNITED STATES PATENT AND TRADEMARK OFFICE
CERTIFICATE OF CORRECTION

PATENT NO. : 6,071,635
DATED : June 6, 2000
INVENTOR(S) : Charles M. Carlstrom, Jr.

It is certified that error appears in the above-identified patent and that said Letters Patent are hereby corrected as shown below:

ON THE TITLE PAGE:

ITEM [73] Assignee: Delete "Plug Power, L.L.C." and replace with --Plug Power Inc.--.

IN THE CLAIMS:

Claim 1, Col. 19, line 31, delete "channels" and replace with --channel--.

Claim 2, Col. 19, line 37, delete "location said" and replace with --location on said--.

Claim 68, Col. 26, line 20, delete "57" and replace with --67--.

Claim 78, Col. 26, line 64, delete "71" and replace with --72--.

Signed and Sealed this

Twenty-fourth Day of April, 2001

Attest:

NICHOLAS P. GODICI

Attesting Officer

Acting Director of the United States Patent and Trademark Office